United States Patent
Hyoudou et al.

(10) Patent No.: US 10,541,861 B2
(45) Date of Patent: *Jan. 21, 2020

(54) NETWORK SYSTEM, METHOD, AND SWITCH DEVICE

(71) Applicant: FUJITSU LIMITED, Kawasaki-shi, Kanagawa (JP)

(72) Inventors: Kazuki Hyoudou, Chofu (JP); Yukihiro Nakagawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 247 days.

This patent is subject to a terminal disclaimer.

(21) Appl. No.: 15/231,802

(22) Filed: Aug. 9, 2016

(65) Prior Publication Data

US 2017/0054591 A1 Feb. 23, 2017

(30) Foreign Application Priority Data

Aug. 19, 2015 (JP) .................................. 2015-162214

(51) Int. Cl.
*H04L 12/707* (2013.01)
*H04L 12/24* (2006.01)

(52) U.S. Cl.
CPC .............. *H04L 41/0668* (2013.01)

(58) Field of Classification Search
None
See application file for complete search history.

(56) References Cited

U.S. PATENT DOCUMENTS 9,960,955 B2 * 5/2018 Nakagawa .......... H04L 41/0659
2003/0056001 A1 3/2003 Mate et al.
(Continued)

FOREIGN PATENT DOCUMENTS

JP 2004-522383 A 7/2004
JP 2006-313949 A 11/2006
(Continued)

OTHER PUBLICATIONS

U.S. Office Action dated Aug. 25, 2017 for copending U.S. Appl. No. 14/530,946, 22 pages.
(Continued)

*Primary Examiner* — Willie J Daniel, Jr.
(74) *Attorney, Agent, or Firm* — Fujitsu Patent Center

(57) ABSTRACT

A system includes a first switch, a second switch, and a processing device. The first switch detects a failure occurring at a first port, generates failure information on the first port when the failure occurring at the first port is detected, and transmits a failure notification packet including the failure information to another switch through a port other than the first port. The second switch transmits a selection-condition-added packet through a port which is coupled to the processing device, the selection-condition-added packet being obtained by adding, to the failure notification packet, selection condition information indicating a selection condition that a second port is selected as a port to relay a packet, the second port having received the failure notification packet through the another switch. And, the processing device performs a path control of a packet based on selection condition information extracted from the selection-condition-added packet received.

18 Claims, 28 Drawing Sheets

(56) References Cited

U.S. PATENT DOCUMENTS

| | | |
|---|---|---|
| 2006/0253606 A1 | 11/2006 | Okuno |
| 2007/0177589 A1 | 8/2007 | Endo |
| 2007/0223368 A1 | 9/2007 | Ozaki |
| 2011/0173492 A1 | 7/2011 | Le Roux et al. |
| 2011/0261723 A1 | 10/2011 | Yamato et al. |
| 2012/0044813 A1 | 2/2012 | Nandagopal et al. |
| 2015/0063361 A1 | 3/2015 | Hamada |
| 2015/0124591 A1 | 5/2015 | Nakagawa et al. |
| 2015/0207675 A1 | 7/2015 | Hayashi |

FOREIGN PATENT DOCUMENTS

| | | |
|---|---|---|
| JP | 2007-189615 | 7/2007 |
| JP | 2007-208369 A | 8/2007 |
| JP | 2007-258926 | 10/2007 |
| JP | 2015-091035 | 5/2015 |
| WO | 03/012672 A2 | 2/2003 |
| WO | 2011/043379 A1 | 4/2011 |

OTHER PUBLICATIONS

U.S. Office Action dated Sep. 9, 2016 for copending U.S. Appl. No. 14/530,946, 23 pages.

U.S. Office Action dated Apr. 28, 2017 for copending U.S. Appl. No. 14/530,946, 18 pages.

Notice of Allowance dated Jan. 18, 2018 for copending U.S. Appl. No. 14/530,946, 13 pages.

Corrected Notice of Allowance dated Feb. 9, 2018 for copending U.S. Appl. No. 14/530,946, 4 pages.

Japanese Office Action dated May 16, 2017 for corresponding Japanese Patent Application No. 2013-230394, with Partial English Translation, 5 pages.

\* cited by examiner

FIG. 9A

| ALGORITHM ID | 1 |
|---|---|

FIG. 9B

| M | m |
|---|---|

FIG. 9C

| PORT NUMBER (P) | CALCULATION RESULT (N) |
|---|---|
| u1 | 0 |
| u2 | 1 |
| ... | |
| uM | M-1 |

FIG. 10

| MEMORY ADDRESS | VLAN ID | MAC ADDRESS | PORT VECTOR (OUTPUT) |
|---|---|---|---|
| 1 | 1 | 00:01:02:03:04:05 | 0x000000001 |
| 2 | 10 | 00:01:02:03:04:06 | 0x000000002 |
| 3 | 1 | 00:01:02:03:04:07 | 0x000000010 |
| ... | | | |
| L | 10 | 00:01:02:03:04:xx | 0x000000100 |

FIG. 12

| LINK SELECTION CONDITION NUMBER = m | PADDING |
|---|---|
| LINK NUMBER M | CALCULATION RESULT N |
| Algorithm ID | PADDING |
| ... | |

FIG. 13

| MEMORY ADDRESS | DESTINATION NODE ID | CONDITION 1 | CONDITION 2 | ... |
|---|---|---|---|---|
| 1 | 00:01:02:03:04:05 | $F(H(p), M)=n$ | $F'(H'(p), M')=n'$ | ... |
| 2 | 00:99:84:AF:B0:34 | $F(H(p), M)=c$ | n/a | ... |
| 3 | n/a | n/a | n/a | ... |
| ... | ... | ... | ... | ... |
| N | ... | ... | ... | ... |

| LINK NUMBER M | ALGORITHM ID | PORT VECTOR OF CALCULATION RESULT N |
|---|---|---|
| 2 | 1 | 0x0000000000000001 |

| ALGORITHM ID | POINTER |
|---|---|
| 1 | |
| 2 | |
| 3 | |
| ... | |
| N | ... |

FIG. 19A

FAILURE INFORMATION TABLE

| DESTINATION NODE ID | CONDITION 1 | CONDITION 2 | ... |
|---|---|---|---|
| Svr3 MAC | F(H(p), M)=0 | F'(H(p), M')=0 | |
| ... | | | |

FIG. 19B

| DESTINATION MAC | TRANSMISSION SOURCE MAC | Ether Type | TRANSMISSION SOURCE IP | DESTINATION IP | L4 Type | L4 Src Port | L4 Dst Port | L4 LENGTH | Payload ... |
|---|---|---|---|---|---|---|---|---|---|
| Svr3 MAC | Svr1 MAC | IP (0x800) | Svr1 IP | Svr3 IP | UDP | xxxx | VXLAN | n bytes | |

FIG. 19C

| DESTINATION MAC | TRANSMISSION SOURCE MAC | Ether Type | TRANSMISSION SOURCE IP | DESTINATION IP | L4 Type | L4 Src Port | L4 Dst Port | L4 LENGTH | Payload ... |
|---|---|---|---|---|---|---|---|---|---|
| Svr3 MAC | Svr1 MAC | IP (0x800) | Svr1 IP | Svr3 IP | UDP | xxx' | VXLAN | n bytes | |

FIG. 22

| MEMORY ADDRESS | POSITION INFORMATION | MASK INFORMATION | PORT VECTOR (OUTPUT) |
|---|---|---|---|
| 1 | Pod-ID=1, ToR-ID=1 | 0xFFFF0000 | 0x000000001 |
| 2 | Pod-ID=1, ToR-ID=2 | 0xFFFF0000 | 0x000000002 |
| 3 | Pod-ID=1, ToR-ID=3 | 0xFFFF0000 | 0x000000004 |
| ... | | | |
| N | Pod-ID=1, ToR-ID=N | 0xFFFF0000 | 0x000000100 |

FIG. 25

| INDEX VALUE | SLOT 1 | SLOT 1 | SLOT 1 | SLOT 1 |
|---|---|---|---|---|
| 1 | dmac#1, Loc ID#1 | dmac#2, Loc ID#2 | dmac#3, Loc ID#1 | dmac#4, Loc ID#3 |
| 2 | dmac#5, Loc ID#4 | dmac#6, Loc ID#1 | dmac#7, Loc ID#3 | dmac#8, Loc ID#5 |
| ... | ... | ... | ... | ... |
| N | | | | |

NETWORK SYSTEM, METHOD, AND SWITCH DEVICE

CROSS-REFERENCE TO RELATED APPLICATION

This application is based upon and claims the benefit of priority of the prior Japanese Patent Application No. 2015-162214, filed on Aug. 19, 2015, the entire contents of which are incorporated herein by reference.

FIELD

The embodiments discussed herein are related to a network system, a method, and a switch device.

BACKGROUND

With a demand for an increased communication band, most of data centers (DC) and the like which provide services such as cloud services employ networks having multipath configurations. When a failure occurs in a multipath network, avoiding a disconnected path (failure avoidance) is highly requested. The failure avoidance further requests minimization of a disconnection time and influence after the failure avoidance.

In one of known techniques for efficiently switching communication paths at failure occurrence, the switching of a plurality of communication paths is performed by rewriting a flow table based on a failure detection notification from another switching device on a leaf node side.

In another one of the known techniques, when a link failure occurs, a packet failure is avoided by executing a fast path change without placing a load on the network.

Still another one of the known techniques involves acquiring information from an instrument, diagnosing the cause of a failure, and calculating a communication path that avoids a range diagnosed as a failure affecting range.

Examples of the related art include Japanese Laid-open Patent Publication Nos. 2015-91035, 2007-258926, and 2007-189615.

SUMMARY

According to an aspect of the invention, a network system includes: a plurality of switch devices including a first switch device and a second switch device; and an information processing device. The first switch device includes: a first plurality of ports; and a first processor configured to: detect a failure occurring at a first port of the first plurality of ports, generate failure information on the first port when the failure occurring at the first port is detected, and transmit a failure notification packet including the failure information to another switch device of the plurality of switch devices through a port among the first plurality of ports other than the first port. The second switch device includes: a second plurality of ports; and a second processor configured to: transmit a selection-condition-added packet through a port among the second plurality of ports which is coupled to the information processing device, the selection-condition-added packet being obtained by adding, to the failure notification packet, selection condition information indicating a selection condition that a second port among the second plurality of ports is selected as a port to relay a packet, the second port having received the failure notification packet through the another switch device. And, the information processing device includes: a transceiver configured to transmit and receive a packet; a first memory configured to store the selection condition information extracted from the selection-condition-added packet received by the transceiver; and a third processor configured to perform a path control of a packet based on the selection condition information in the first memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 9A, 9B, and 9C each illustrate an exemplary configuration of a port selection condition table;

FIG. 10 illustrates an exemplary configuration of a destination node table;

FIG. 12 illustrates a detailed exemplary configuration of a link selection condition list;

FIG. 13 illustrates an exemplary configuration of a failure information table;

FIGS. 19A, 19B, and 19C each illustrate exemplary packet header processing;

FIG. 22 illustrates another exemplary configuration of the destination node table;

FIG. 25 illustrates an exemplary correspondence table of a node ID and a location ID.

DESCRIPTION OF EMBODIMENT

In the conventional techniques, a path change is performed also on a flow not affected by a failure, which may cause the following problems: a failure affects a wide range, a long time is taken to return to normal, and reduction in time to complete the path change is not taken into account, for example.

The present embodiment aims to minimize the failure affecting range after failure avoidance and achieve fast failure path avoidance.

An increase in communication band has been desired at a data center that provides, for example, a cloud service, and therefore a network having a multipath configuration is widely employed. Avoiding a path that is disconnected at failure occurrence (failure avoidance) is requested in a multipath network. The failure avoidance highly requests minimization of a disconnection time and influence after failure avoidance.

The present embodiment includes the following configurations.

A switching device configured to, when having detected a failure, notify failure information including, as a failure affecting range, information on a node group coupled to a failure spot (port).

A switching device configured to, when having received the failure notification, transmit the failure notification along with a condition that a port through which the notification has been received is selected as a relay point.

A transmission node configured to, when having received the failure notification, record the information, specify a flow affected by the failure based on the information, and process a packet belonging to the flow so that the packet does not satisfy a condition that the packet is relayed to the failure spot. The failure affecting range includes information on a destination node group coupled to the failure spot, for example, a media access control (MAC) address thereof.

In the present embodiment, applying the above-described configuration to a network not employing a routing protocol enables notification of a failure in a fixed time dependent on the number of network levels, thereby achieving a network system capable of performing fast failure avoidance. The application of the configuration also achieves a network system achieving effective use of a communication band even when a failure occurs, by performing a path change of a flow affected by the failure.

Figure 1:
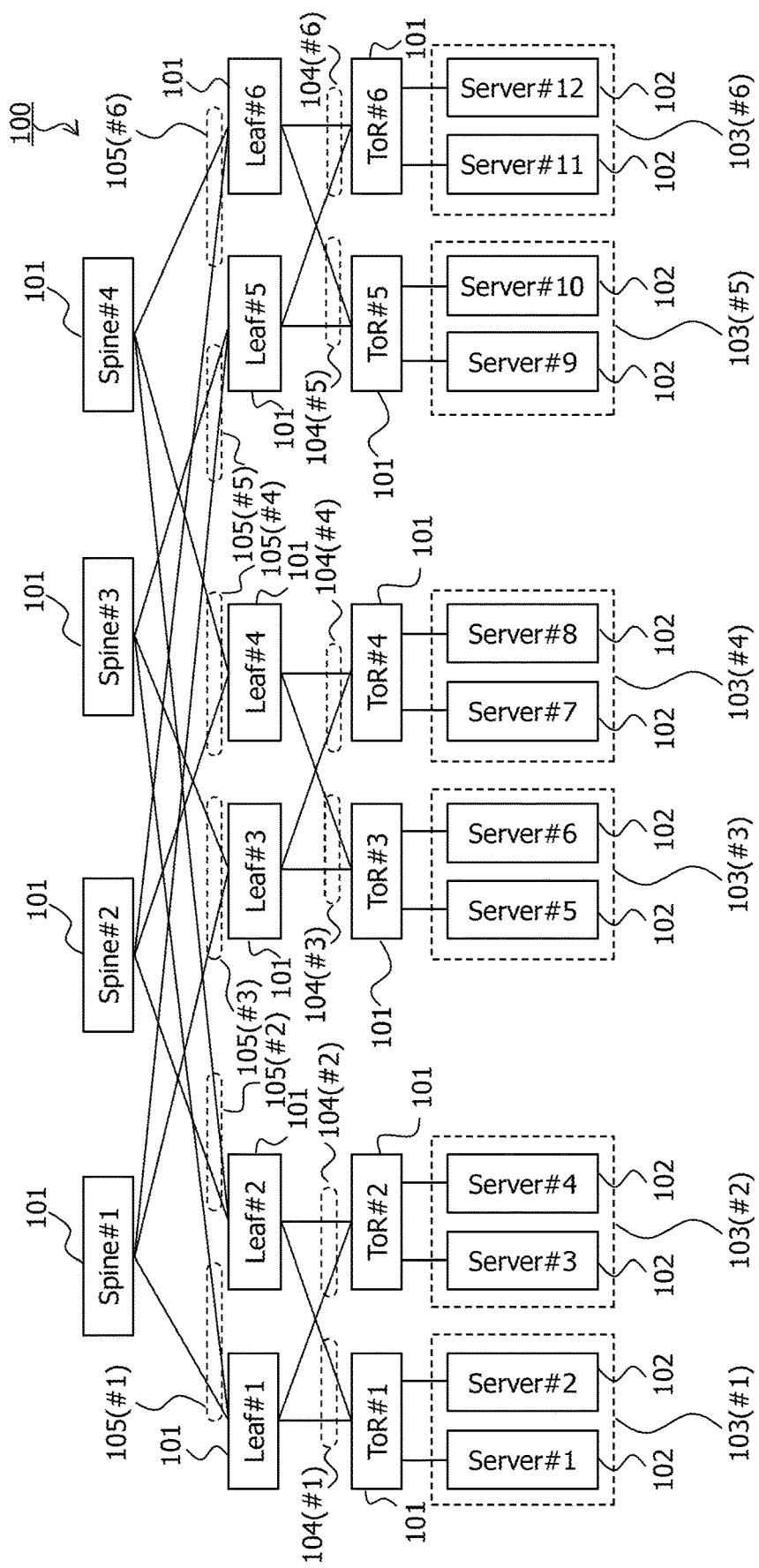
FIG. 1 illustrates a configuration example of a network according to an embodiment of a network system.

The following describes configurations for achieving the present embodiment in detail with reference to the drawings. FIG. 1 illustrates an exemplary configuration of a network to which an embodiment of a network system 100 is applied.

The network system 100 exemplarily illustrated in FIG. 1 constitutes, for example, a network of a data center.

The network system 100 constitutes a network called a fat tree, having a three-level structure, in which a plurality of switching devices 101 each serves as Spine, Leaf, or ToR (top of rack).

A first level (topmost level) includes four switching devices 101 of, for example, Spine #1, Spine #2, Spine #3, and Spine #4.

A second level includes six switching devices 101 of, for example, Leaf #1, Leaf #2, . . . , Leaf #6.

A third level (bottommost level) includes six switching devices 101 of, for example, ToR #1, ToR #2, . . . , ToR #6.

Two downstream (downlink) ports of ToR #1 are respectively coupled to Server #1 and Server #2 as server computers housed in rack 103(#1). Similarly, two downlink ports of ToR #2 are coupled to Server #3 and Server #4 housed in rack 103(#2). Similarly, two downlink ports of ToR #3 are coupled to Server #5 and Server #6 housed in rack 103(#3). Similarly, two downlink ports of ToR #4 are coupled to Server #7 and Server #8 housed in rack 103(#4). Similarly, two downlink ports of ToR #5 are coupled to Server #9 and Server #10 housed in rack 103(#5). Similarly, two downlink ports of ToR #6 are coupled to Server #11 and Server #12 housed in rack 103(#6). Servers #1 to #12 are not limited to server computers, but may be, for example, router devices coupled to other networks. In the following description, Servers #1 to #12 are collectively referred to as end nodes 102. Each end node 102 corresponds to an information processing device.

First and second upstream (uplink) ports of ToR #1 are respectively coupled to first downlink ports of Leaf #1 and Leaf #2 of the second level through a group of links 104(#1). First and second uplink ports of ToR #2 are respectively coupled to second downlink ports of Leaf #1 and Leaf #2 of the second level through a group of links 104(#2). First and second uplink ports of ToR #3 are respectively coupled to first downlink ports of Leaf #3 and Leaf #4 of the second level through a group of links 104(#3). First and second uplink ports of ToR #4 are respectively coupled to second downlink ports of Leaf #3 and Leaf #4 of the second level through a group of links 104(#4). First and second uplink ports of ToR #5 are respectively coupled to first downlink ports of Leaf #5 and Leaf #6 of the second level through a group of links 104(#5). First and second uplink ports of ToR #6 are respectively coupled to second downlink ports of Leaf #5 and Leaf #6 of the second level through a group of links 104(#6).

The first and second uplink ports of Leaf #1 are respectively coupled to first downlink ports of Spine #1 and Spine #3 at the first level through a group of links 105(#1). The first and second uplink ports of Leaf #2 are respectively coupled to first downlink ports of Spine #2 and Spine #4 at the first level through a group of links 105(#2). The first and second uplink ports of Leaf #3 are respectively coupled to second downlink ports of Spine #1 and Spine #3 at the first level through a group of links 105(#3). The first and second uplink ports of Leaf #4 are respectively coupled to second downlink ports of Spine #2 and Spine #4 at the first level through a group of links 105(#4). The first and second uplink ports of Leaf #5 are respectively coupled to third downlink ports of Spine #1 and Spine #3 at the first level through a group of links 105(#5). The first and second uplink ports of Leaf #6 are respectively coupled to third downlink ports of Spine #2 and Spine #4 at the first level through a group of links 105(#6).

In the following description, the switching devices 101 and the end nodes 102 included in the network system 100 are also collectively referred to as nodes. A MAC address allocated to each node is also referred to as a node ID.

As described above, in a network topology of the network system 100 illustrated in FIG. 1, a plurality of the links 104 (between the third level and the second level) and the links 105 (between the second level and the first level) exist on the uplink side in a direction from the third level (bottommost level) to the first level (topmost level). In contrast, a path is uniquely determined from a switching device 101 at each level to an end node 102 under this device. Without a failure, there exists a path from any most upstream Spine to each Server. In other words, when no failure occurs, a packet reaches at a target destination through any selected path, each switching device 101 on the uplink side performs a relay by selecting, through a load distribution mechanism, a port from among a plurality of ports coupled to a plurality of links on the uplink side.

A path control area of the network system 100 having a multipath configuration in FIG. 1 allowed to be large in scale includes two areas in which relay methods having different characteristics are employed as follows.

Area 1: an area in which a plurality of paths exist toward upstream in a packet transmission from an end node 102 to a switching device 101 as a turning point when a destination does not exist at downlink (end-node side) ports of a switching device 101. In other words, Area 1 is an area up to the switching device 101 as the turning point from an end node 102 as a source of a transmission in which a path from the end node 102 as the source of the transmission to an end node 102 as a destination of the transmission.

Area 2: an area in which a path is uniquely determined in a packet transmission from a switching device 101 as a turning point to an end node 102 when a destination exists at an end-node side port of the switching device 101. In other words, Area 2 is an area up to an end node 102 as a destination of a transmission from the switching device 101 as the turning point in which a path from an end node 102 as a source of the transmission to the end node 102 as the destination of the transmission.

In a typical open flow method, a switching device executes a flow control using an access control list (ACL). In an ACL method, the switching device holds an access control list. Having received a packet, the switching device performs matching between each condition on this list and each field of the packet, and relays the packet to a port corresponding to any matched condition. However, in the ACL method, a controller is required to perform a centralized control of a flow on a network system and set the ACL to each switching device.

For Area 1, the switching device 101 according to the present embodiment recognizes a plurality of valid uplink-side ports (without a failure) at which a plurality of links 104 or 105 are terminated, as a single logical port for each flow in a LAG method. Then, for Area 1, the switching device 101 controls a switching unit to execute load distribution processing of relaying a packet from a downlink-side port to an uplink-side port.

In the present embodiment, in Area 2, the switching device 101 executes a unique path control using a forwarding database (FDB) when relaying a packet from an uplink-side port to a downlink-side port. Specifically, the switching device 101 learns a correspondence relation between a destination MAC address and a port number at a downlink-side port to register the correspondence relation to the FDB, and performs a path control based on the FDB. Thus, in a packet relay from the uplink-side port to the downlink-side port, packets having the same destination are accordingly relayed to the same downlink-side port to execute a unique path control when no failure occurs. In this processing, a learning packet is transmitted from an end node 102 to a switching device 101 as a Spine so that the FDB is reliably set.

The present embodiment performs a path control through load distribution in Area 1 and a path control on a downlink-side port based on the FDB in Area 2, thereby achieving the network system 100, which does not include the controller.

Figure 2A:
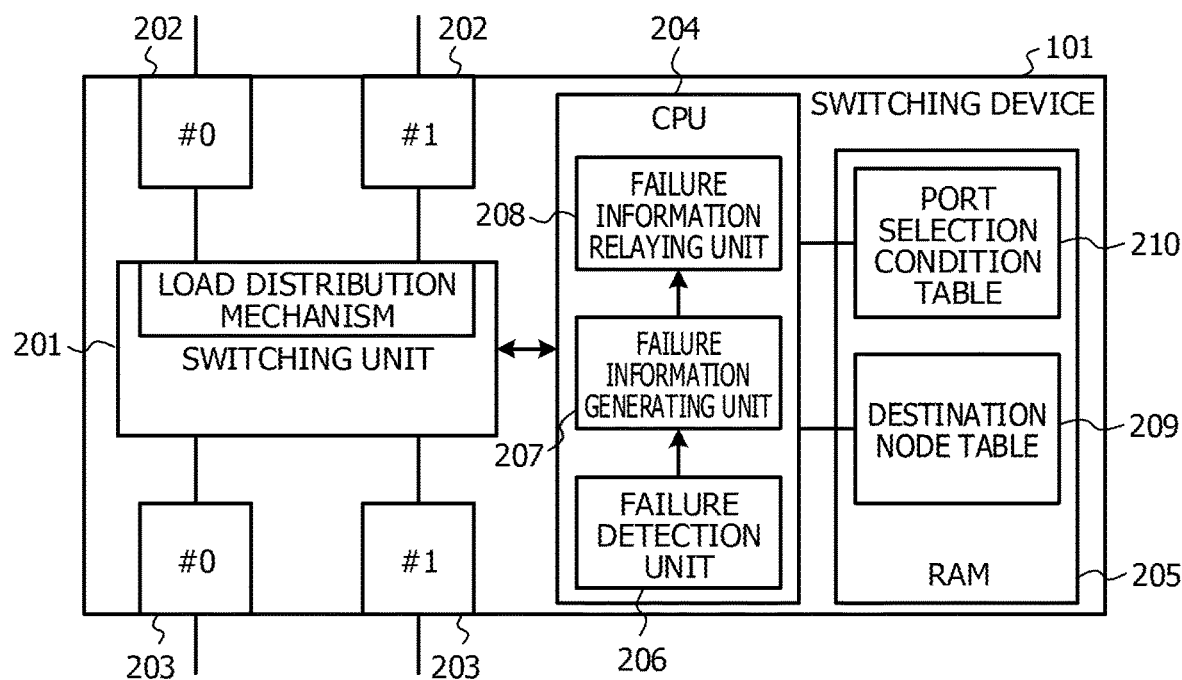
FIGS. 2A and 2B are block diagrams of exemplary configurations of a switching device and an end node.
Figure 2B:
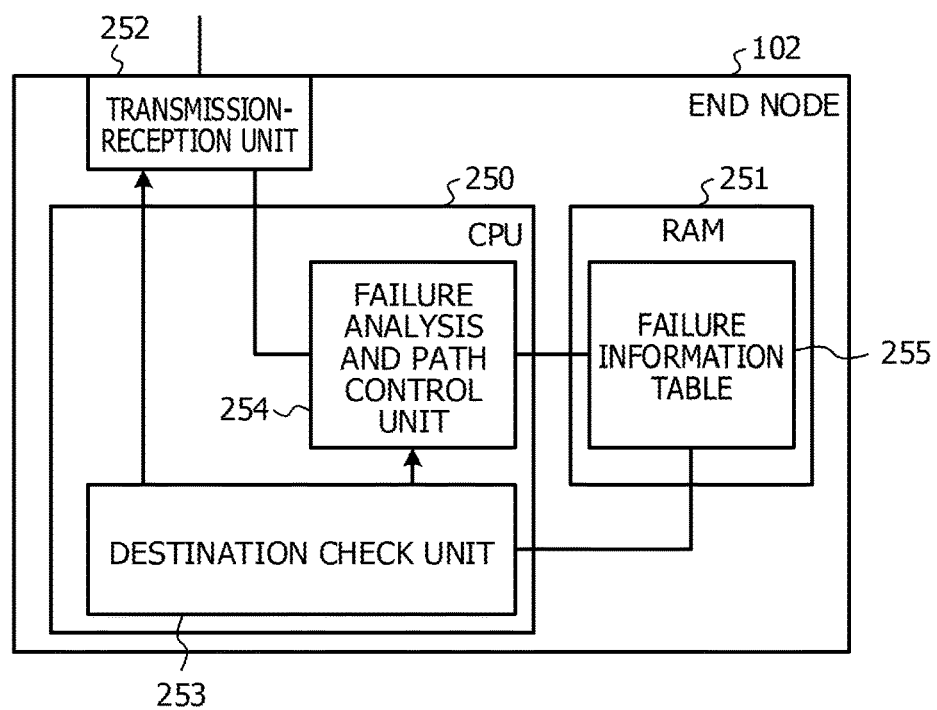

FIGS. 2A and 2B are block diagrams illustrating exemplary configurations of each switching device 101 and each end node 102 in FIG. 1, respectively. Each switching device 101 at the levels of Spine, Leaf, and ToR in FIG. 1 shares the same configuration irrespective of the different network levels. The configuration of the switching device 101 may differ between the levels depending on a function allocated to the device.

The switching device 101 illustrated in FIG. 2A includes a switching unit 201, an uplink-side port 202, a downlink-side port 203, a central processing unit (CPU) 204, and a random access memory (RAM) 205.

In the switching device 101 as a Leaf in FIG. 1, the group of links 105 is terminated so that the uplink-side port 202 communicates a packet with the downlink-side port 203 of the switching device 101 as a Spine. In the switching device 101 as a ToR in FIG. 1, the group of links 104 is terminated so that the uplink-side port 202 communicates a packet with the downlink-side port 203 of the switching device 101 as a Leaf. The example in FIG. 2A illustrates that the two uplink-side ports 202 of #0 and #1 are mounted to terminate two links, but is not limited thereto, and the uplink-side ports 202 may be mounted in a larger number.

In the switching device 101 as a Spine in FIG. 1, the group of links 105 are terminated so that the downlink-side port 203 communicates packets with the uplink-side port 202 of the switching device 101 as a Leaf. In the switching device 101 as a Leaf in FIG. 1, the group of links 104 are terminated so that the downlink-side port 203 communicates packets with the uplink-side port 202 of the switching device 101 as a ToR. In addition, in the switching device 101 as a ToR in FIG. 1, a link coupled to an end node 102 as a Server is terminated so that the downlink-side port 203 communicates packets with a port of a transmission-reception unit (252 in FIG. 2B) of an end node 102 as a Server #. The example in FIG. 2A illustrates that the two downlink-side ports 203 of #0 and #1 are mounted to terminate two links, but is not limited thereto, and the downlink-side ports 203 may be mounted in a larger number.

The switching unit 201 relays packets between the uplink-side port 202 and the downlink-side port 203, between the uplink-side ports 202, or between the downlink-side ports 203.

The CPU 204 controls an entire operation of the switching device 101, and in particular, executes a control program stored in a read-only memory (ROM) not illustrated. Accordingly, the CPU 204 controls operations of the relay function of the switching unit 201 and functions of a failure detection unit 206, a failure information generating unit 207, and a failure information relaying unit 208 illustrated in FIG. 2A. These functions may be implemented by, for example, hardware as a field programmable gate array (FPGA) or hardware as a combination of the FPGA and the CPU.

The RAM 205 stores a destination node table 209 and a port selection condition table 210 to be described later.

The end node 102 illustrated in FIG. 2B includes a CPU 250, a RAM 251, and a transmission-reception unit 252.

The CPU 250 controls operations of transmission and reception of packets through the transmission-reception unit 252, and controls operations of functions of a destination check unit 253 and a failure analysis and path control unit 254 illustrated in FIG. 2B. Similarly to the CPU 204, these functions may be implemented by, for example, hardware as a FPGA or hardware as a combination of the FPGA and the CPU.

The RAM 251 stores a failure information table 255 (failure information storage) to be described later.

The destination check unit 253 and the failure analysis and path control unit 254 operate as a control unit configured to perform path control of a packet based on selection condition information stored in the failure information table 255.

The following describes a basic operation of the path control of a packet in the network system 100 in FIG. 1 including the switching device 101 and the end node 102 having the configurations illustrated in FIGS. 2A and 2B.

First, an operation when a failure is detected in the downlink-side port 203 and the uplink-side port 202 in the switching device 101 will be described.

A failure notification and transmission operation when the downlink-side port 203 has detected a failure will be described below. In the failure notification and transmission operation, the switching device 101 notifies transmission nodes of an influence range of the failure and a link selection condition on selection of a link to a failure path. Specifically, having detected a failure, the switching device 101 notifies another switching device 101 coupled to the switching device 101 having detected the failure, of a failure notification packet storing information (destination information) on a group of end nodes 102 coupled to a failure spot. The switching device 101 having received the failure notification packet forwards the failure notification packet to another switching device 101 along with a condition that the uplink-side port 202 through which the failure notification packet has been received is selected as a relay point link. The relay processing of failure notification packet is repeatedly executed until the failure notification packet reaches at an end node 102 as the transmission node thereof. Having received the failure notification packet, the transmission node records a condition that a packet passes through the failure spot corresponding to the destination information (combination of the link selection condition of each switching device 101 on the way to the failure spot).

Figure 3A:
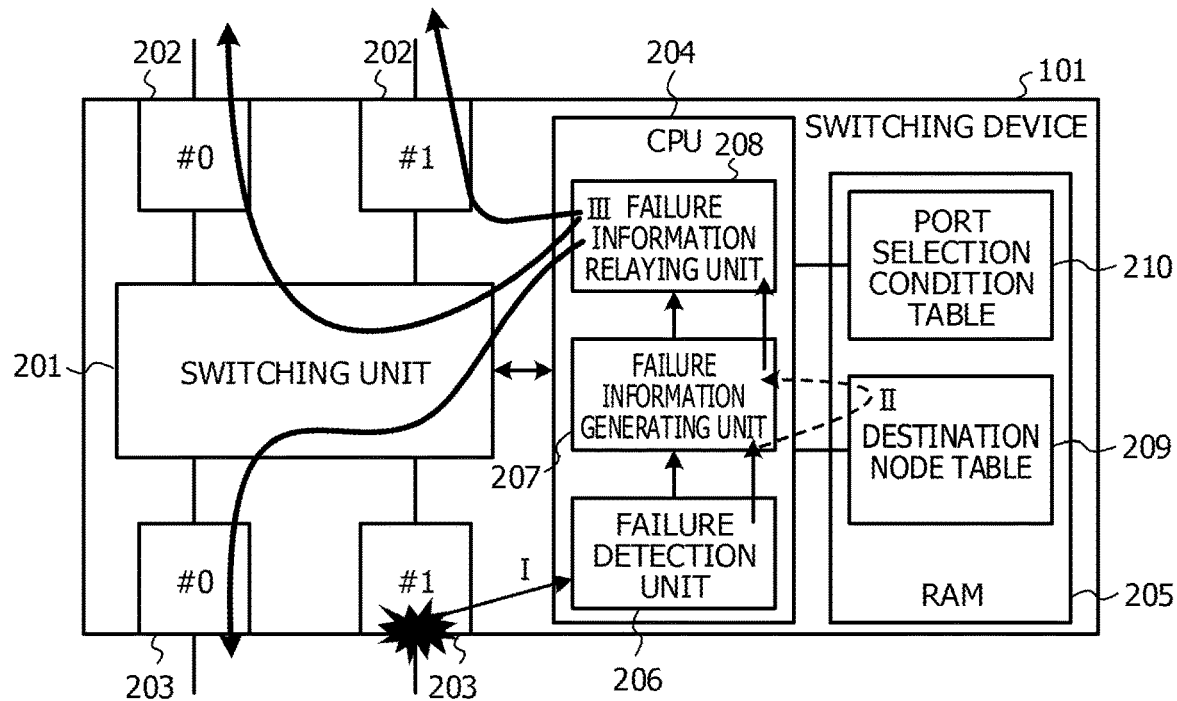
FIGS. 3A, 3B, and 3C are each an explanatory diagram of failure notification and transmission operation of the switching device and the end node at a downlink failure.
Figure 3B:
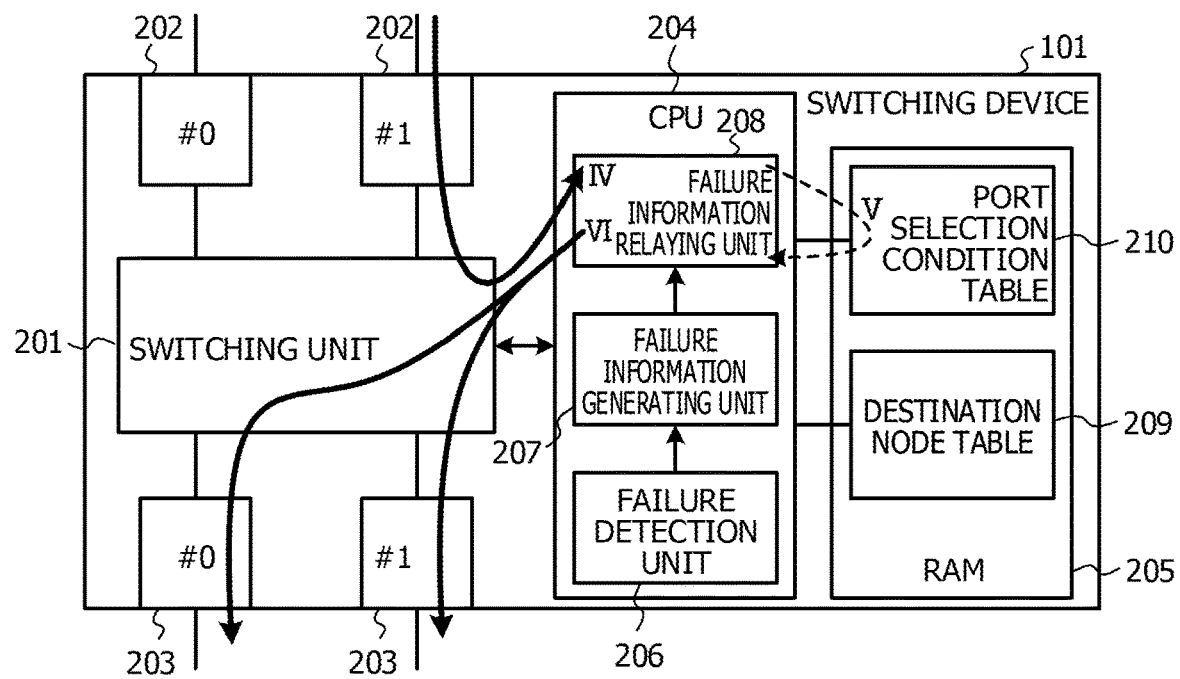
Figure 3C:
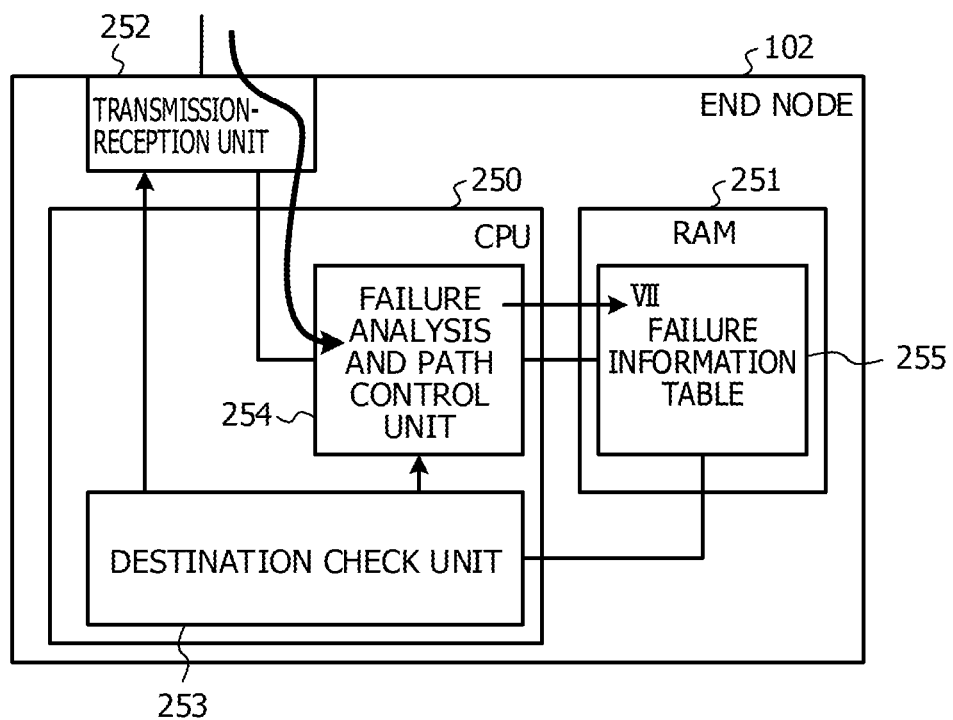

FIGS. 3A, 3B, and 3C are each an explanatory diagram of the failure notification and transmission operation of the switching device 101 and the end node 102 when a downlink failure occurs.

The switching device 101 is classified as, depending on its function when the failure occurs, the switching device 101 having detected a failure, or the switching device 101 having received a failure notification from the switching device 101 having detected the failure. Hereinafter, the former is referred to as a first switching device, and the latter is referred to as a second switching device. The first switching device is the switching device 101 that has detected a failure through the downlink-side port 203, and the downlink-side port 203 of which is not directly coupled to the end node 102 (Server). The first switching device is a Spine or a Leaf in FIG. 1. The second switching device is the switching device 101 that has received a failure notification through the uplink-side port 202. The second switching device is a Leaf or a ToR in FIG. 1.

FIG. 3A is an explanatory diagram of an operation of the first switching device when a failure is detected. First, the failure detection unit 206 (detection unit) as a function executed by the CPU 204 detects a failure occurring at, for example, the downlink-side port 203 (first port unit) of #1 (port number=1) among the downlink-side ports 203 of #0 and #1. This is Operation I illustrated in FIG. 3A.

Next, the failure information generating unit 207 (generating unit) as a function executed by the CPU 204 generates failure information on the downlink-side port 203 of #1 at which the failure is detected. The failure information generating unit 207 acquires, from the destination node table 209, information on a destination node corresponding to, for example, the downlink-side port 203 of #1 at which the failure is detected, and then generates failure information including the acquired destination node information. As described above, since a path is uniquely determined from a device to the end node 102 under the device, the above-described failure information generation processing generates failure information including information on the destination node coupled to the failure detected port. This is Operation II in FIG. 3A.

Finally, the failure information relaying unit 208 (first relaying unit) as a function executed by the CPU 204 notifies other switching devices 101 of a failure notification packet including the failure information generated by the failure information generating unit 207 through paths denoted by III in FIG. 3A. Specifically, the failure information relaying unit 208 sends the failure notification packet to the downlink-side port 203 of #0 and the uplink-side ports 202 of #0 and #1 as indicated by III in FIG. 3A other than the downlink-side port 203 of #1 (first port unit) at which the failure information is detected.

FIG. 3B is an explanatory diagram of an operation of the second switching device as the switching device 101 having received the failure notification packet (including a selection-condition-added packet to be described later) from another switching device 101 through, for example, the uplink-side port 202 of #1 (second port unit).

The failure information relaying unit 208 (second relaying unit) as a function executed by the CPU 204 receives the failure notification packet through the uplink-side port 202 of #1 through a path of Operation IV. As indicated by Operation V, the failure information relaying unit 208 acquires the selection condition information corresponding to the uplink-side port 202 of #1 having received the failure notification packet, from the port selection condition table 210 in the RAM 205, and adds the selection condition information to the failure notification packet to generate the selection-condition-added packet. A selection condition is a condition that the uplink-side port 202 of #1 having received the failure notification packet is selected as a port at a relay point by the load distribution mechanism when the second switching device relays a packet from the downlink-side port 203 to the uplink-side port 202.

Then, as illustrated as Operation VI in FIG. 3B, the failure information relaying unit 208 transmits the generated selection-condition-added packet as a new failure notification packet through the downlink-side port 203 of #0 or #1 to which the end node 102 (information processing device) is coupled.

The same operation of the second switching device illustrated in FIG. 3B is performed by the second switching device at the second level or higher having received, as the failure notification packet, the above-described selection-condition-added packet to which the selection condition is add. Thus, each second switching device adds the selection condition information of the device to a received failure notification packet.

The above describes the operation of the second switching device when a failure notification packet is received through the uplink-side port 202. Next, an operation of the second switching device when a failure notification packet is received at the downlink-side port 203 will be described. Although not particularly illustrated, having received a failure notification packet from another switching device 101 through the downlink-side port 203 of #0 or #1, the failure information relaying unit 208 of the CPU 204 in the second switching device executes the following operation. As described above, a unique path toward the downlink-side port 203 is already determined. Thus, the failure information relaying unit 208 transmits the failure notification packet with no selection condition information added, to another switching device 101 through all valid downlink-side ports 203 other than the downlink-side port 203 having received the failure notification packet, or through the uplink-side port 202.

FIG. 3C is an explanatory diagram of an operation of the end node 102 (information processing device) having received a failure notification packet from the switching device 101.

In FIG. 3C, the transmission-reception unit 252 transmits and receives packets to and from the switching device 101 (the first switching device or the second switching device).

The failure analysis and path control unit 254 in the CPU 250 and the failure information table 255 in the RAM 205 operate as a failure information storage. The failure analysis and path control unit 254 in the CPU 250 extracts information on at least one destination node as a failure affecting range, at least one link selection condition as the selection condition information, from a failure notification packet (selection-condition-added packet) received by the transmission-reception unit 252. Then, as in Operation VII in FIG. 3C, the CPU 250 stores at least one link selection condition extracted for each extracted destination node information in the failure information table 255 in the RAM 251.

Next, a path control operation at a transmission node (end node 102) when transmitting a packet in a flow affected by a failure will be described. In the path control operation when a packet is transmitted from the transmission node, processing of finding a failure path passing flow and changing header information at the transmission node is executed. When failure information for the destination of transmission data is recorded, the transmission node determines from a recorded condition whether the flow of this transmission passes through a failure spot. Having determined that the flow passes through the failure spot, the transmission node processes header information of the transmission flow so that the flow does not pass through the failure spot. The header information is the port number of a transmission source conforming to, for example, a layer 4 (L4) protocol. The L4 protocol is, for example, a user data protocol (UDP) or a transmission control protocol (TCP).

Figure 4A:
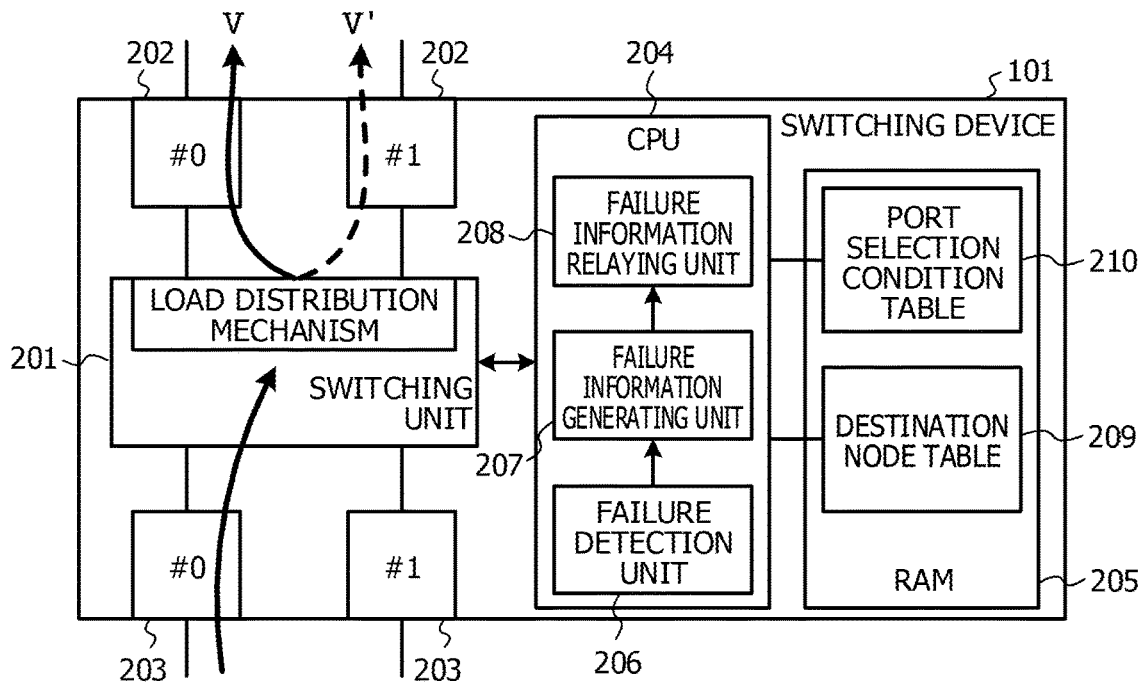
FIGS. 4A and 4B are each an explanatory diagram of a path control operation at transmission of a packet in a flow affected by a failure.
Figure 4B:
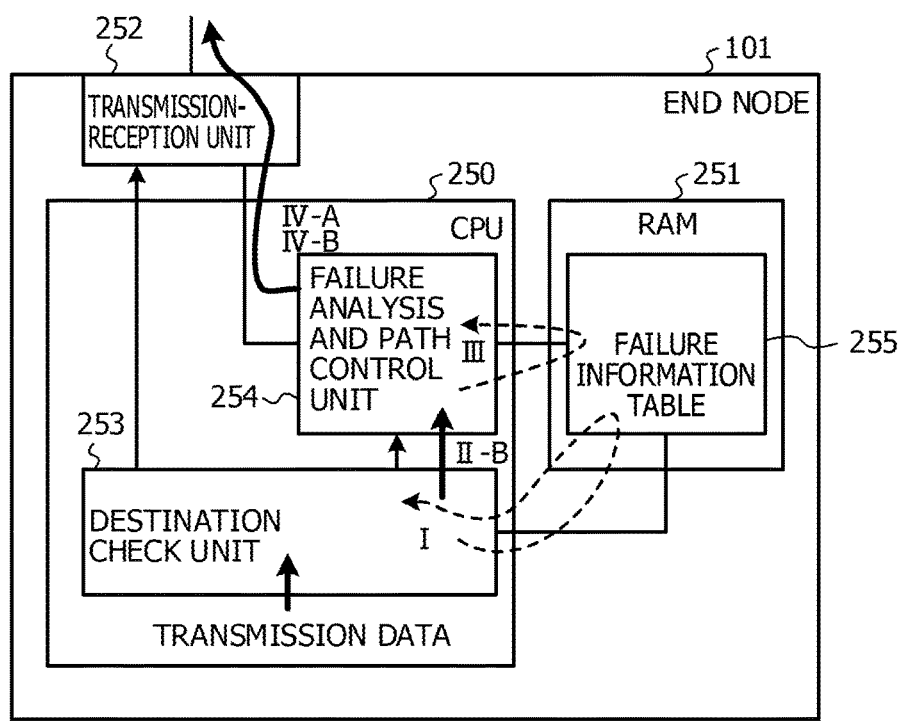

FIGS. 4A and 4B are each an explanatory diagram of the path control operation when a packet in a flow affected by a failure is transmitted. The following first describes a path on which a packet transmitted from a transmission node (end node 102) in FIG. 4B and addressed to an end node 102 corresponding to information on a destination node included in the failure affecting range reaches at a switching device 101 (the first switching device) at which the failure is detected. The selection condition information in an entry for each destination node information in the failure information table 255 indicates a selection condition that the uplink-side port 202 of each switching device 101 (second switching device) on the path is selected by the load distribution mechanism of the switching device 101.

Before the end node 102 transmits a packet, the destination check unit 253 of the CPU 250 in the end node 102 searches whether the failure information table 255 includes an entry corresponding to destination node information set to the packet (Operation I in FIG. 4B).

If no corresponding entry is found, a transmission packet never arrives at the downlink-side port 203 at which a failure is detected in the switching device 101 at which the failure occurs. Thus, the destination check unit 253 transmits the packet with no processing thereon from the transmission-reception unit 252 (Operation II-A in FIG. 4B).

If the corresponding entry is found, the destination check unit 253 passes control to the failure analysis and path control unit 254 (Operation II-B in FIG. 4B). The failure analysis and path control unit 254 determines whether the transmission packet satisfies all link selection conditions stored in the entry, in other words, whether the transmission packet passes through a failure path (Operation III in FIG. 4B).

If the transmission packet does not satisfy a link selection condition in the entry, it is determined that the packet does not reach at the switching device 101 (first switching device) at which the failure occurs, after being transmitted from the end node. In this case, similarly to Operation II-A in FIG. 4B described above, the failure analysis and path control unit 254 transmits the packet with no processing thereon from the transmission-reception unit 252 (Operation IV-A in FIG. 4B).

If the transmission packet satisfies all link selection conditions in the entry, the packet will reach at the switching device 101 (first switching device) at which the failure occurs through the switching device 101 (second switching device) on its way after being transmitted from the end node. In this case, in the switching device 101 at which the failure is detected, after having been received at the uplink-side port 202, the packet requests to be relayed by the downlink-side port 203 toward an end node 102 corresponding to the destination node information set to the packet. However, the downlink-side port 203 at a relay point selected based on the destination node table 209 stored in the RAM 205 in the switching device 101 (first switching device) is closed due to the occurrence of the failure. Thus, the switching unit 201 in the switching device 101 may not relay the packet toward the end node 102 corresponding to the destination node information set to the packet, and thus may not distribute the packet.

In the present embodiment, if the transmission packet satisfies all link selection conditions in the entry, the failure analysis and path control unit 254 processes the header information of the packet so that the transmission packet avoids a failure path, without affecting distribution of the packet. Then, the failure analysis and path control unit 254 transmits this packet after the header process from the transmission-reception unit 252 (Operation IV-B in FIG. 4B).

When the packet is transmitted from the end node 102 after this process, the following operation is executed by, for example, the load distribution mechanism of the switching unit 201 in the switching device 101 (second switching device) illustrated in FIG. 4A coupled to the end node 102. As illustrated in FIG. 4A, after having been received by, for example, the downlink-side port 203 of #0, the packet is input to the load distribution mechanism as indicated by a solid line arrow. The load distribution mechanism controls the switching unit 201 so as to relay the packet received by the downlink-side port 203 to the uplink-side port 202.

If the header of the packet is not processed, the switching unit 201 sends the packet received by the downlink-side port 203 of #0 to the uplink-side port 202 of #1 on a path toward the switching device 101 (first switching device) at which the failure is detected. This is Operation V' exemplarily illustrated by a dashed line arrow from the switching unit 201 toward the uplink-side port 202 of #1 in FIG. 4A.

However, if the header of the packet is processed at the end node 102 at a transmission source as described above, the load distribution mechanism executes the load distribution processing based on a different packet header. As a result, the switching unit 201 sends the packet received by the downlink-side port 203 of #0 to the uplink-side port 202 of #0 different from the uplink-side port 202 of #1 on a path toward the switching device 101 (first switching device) at which the failure is detected. This is Operation V exemplarily illustrated by a solid line arrow from the switching unit 201 toward the uplink-side port 202 of #0 in FIG. 4A.

As described above in the present embodiment, the end node 102 at the transmission source of the packet may perform such a path control that the transmission packet does not arrive at the switching device 101 (first switching device) at which the failure is detected.

In the network system 100 in FIG. 1, paths from a plurality of Spines are allocated to each Server (end node 102). Thus, a packet sent from, for example, the uplink-side port 202 of #1 of the switching device 101 in FIG. 4A arrives at a destination node (the end node 102) through a path not including the switching device 101 at which a failure is detected (refer to FIG. 7 to be described later). As described above, the present embodiment may minimize the failure affecting range after failure avoidance and achieve fast failure path avoidance. In addition, the present embodiment performs a path change only on a flow affected by a failure, thereby achieving effective use of a transmission band at failure occurrence.

Figure 5A:
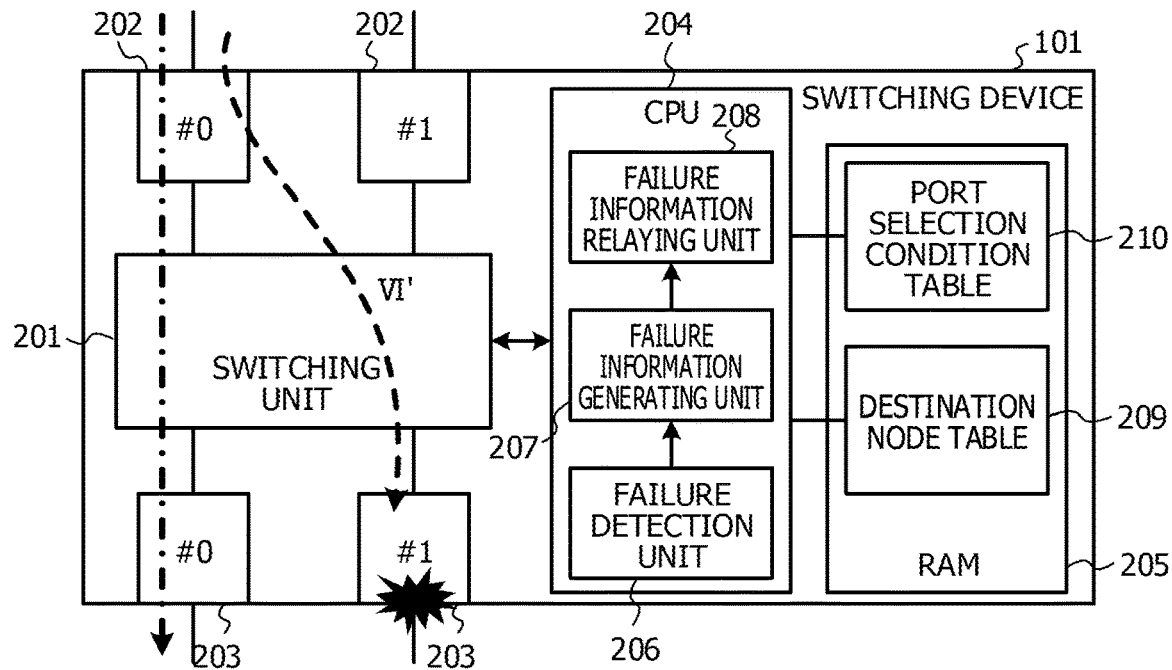
FIGS. 5A, 5B, and 5C are each an explanatory diagram of a path control operation at transmission of a packet in a flow not affected by a failure.
Figure 5B:
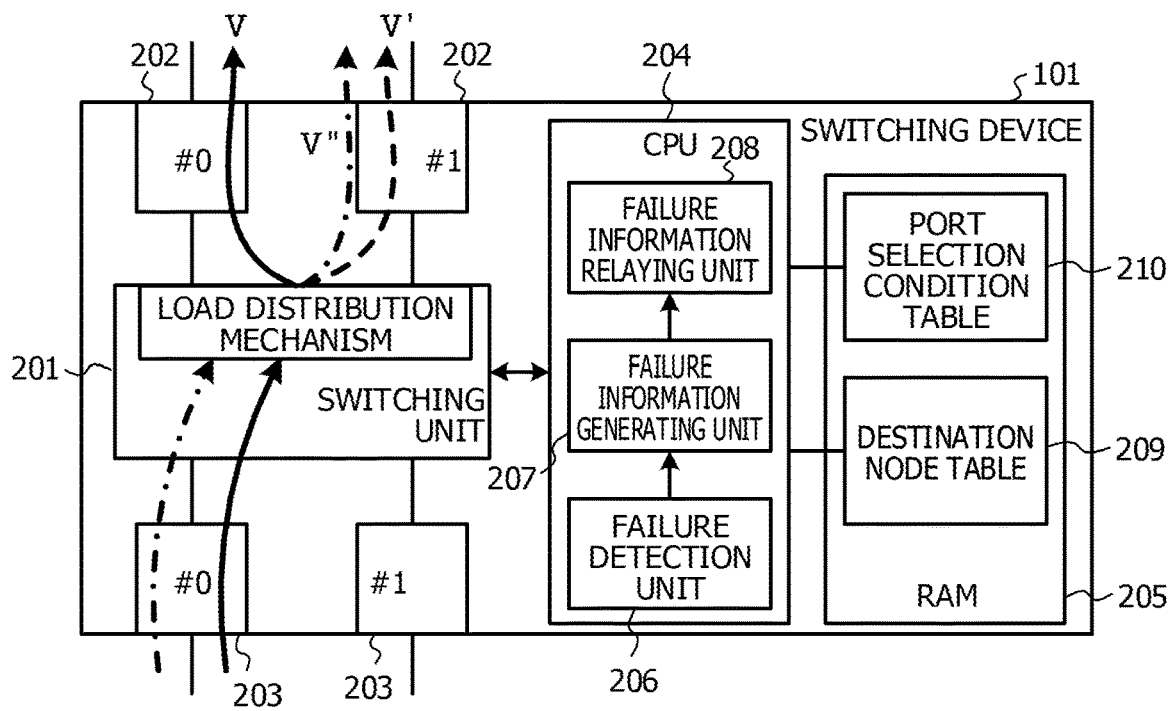
Figure 5C:
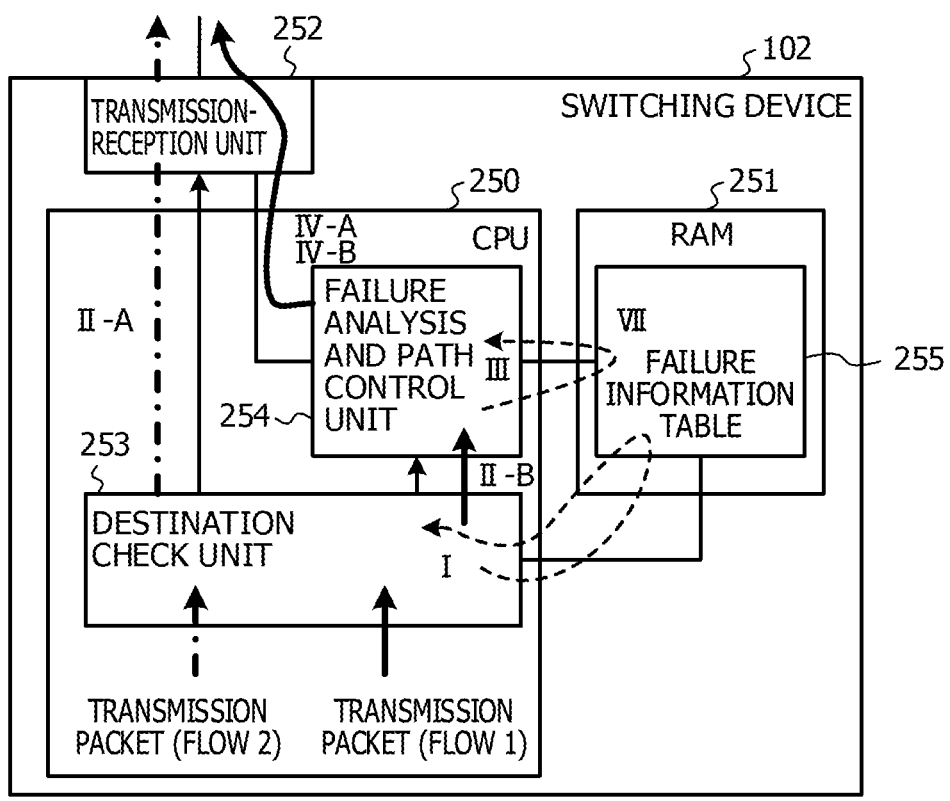

FIGS. 5A, 5B, and 5C are each an explanatory diagram of the path control operation at transmission of a packet in a flow not affected by a failure.

FIGS. 5B and 5C correspond to FIGS. 4A and 4B, respectively. A solid line arrow in FIGS. 5B and 5C is the same as the corresponding solid line arrow in FIGS. 4A and 4B, and indicates a path on which a transmission packet (flow 1) is controlled by processing the header thereof so as not to arrive at the switching device 101 (first switching device) at which a failure is detected. Operations I, II-B, III, IV-A, IV-B, V, and V' in FIGS. 5B and 5C are the same as Operations I, II-B, III, IV-A, IV-B, V, and V' in FIGS. 4A and 4B, respectively.

A dashed line arrow in FIG. 5B is the same as the corresponding dashed line arrow in FIG. 4A. If the transmission packet (flow 1) is transmitted with no processing on the header thereof, the packet will arrive at the switching device 101 (first switching device) at which a failure is detected. FIG. 5A illustrates a relay operation of a packet in the switching device 101 (first switching device). As illustrated in FIG. 5A, having arrived at the uplink-side port 202 of #0 with no processing on the header thereof, the packet is relayed by the switching unit 201 to the downlink-side port 203 of #1 at which the failure is detected based on destination node information added to the packet. This is Operation VI' in FIG. 5A. Thus, this packet is not distributed to the destination node (end node 102). In order to avoid such a problem, as described above, the present embodiment controls the transmission packet (flow 1) not to arrive at the switching device 101 (first switching device) at which the failure is detected by processing the header of the packet.

In contrast, the following path control is performed on a transmission packet (flow 2) transmitted up to the switching device 101 at which the failure is detected in FIG. 5A, but addressed to an end node 102 other than an end node 102 coupled to the downlink-side port 203 of #1.

At the end node 102 as the transmission source of the transmission packet (flow 2), the destination check unit 253 in the CPU 250 searches whether the failure information table 255 includes an entry corresponding to destination node information set to the packet (Operation I in FIG. 5C). This destination node information corresponds to an end node 102 other than the end node 102 coupled to the downlink-side port 203 of #1 at which the failure is detected in the switching device 101 at which the failure is detected in FIG. 5A. Thus, no entry corresponding to the destination node information is found on the failure information table 255. As a result, the destination check unit 253 transmits the transmission packet (flow 2) with no processing thereon from the transmission-reception unit 252 (Operation II-A in FIG. 5C).

When the packet is transmitted from the end node 102, the following operation is executed by, for example, the load distribution mechanism of the switching unit 201 in the switching device 101 (second switching device) (illustrated in FIG. 5B) coupled to the end node 102. As illustrated in FIG. 5B, after having been received by, for example, the downlink-side port 203 of #0, the packet is input to the load distribution mechanism as indicated by a dashed and single-dotted line arrow. The load distribution mechanism controls the switching unit 201 so as to send the packet received by the downlink-side port 203 of #0 to the uplink-side port 202 of #1 on a path toward the switching device 101 at which the failure is detected (first switching device). This is Operation V" exemplarily illustrated by a dashed and single-dotted line arrow from the switching unit 201 toward the uplink-side port 202 of #1 in FIG. 5B.

This packet passes through several switching devices 101 (second switching devices) before arriving at the switching device 101 (first switching device) in FIG. 5A at which the failure is detected, and is received by, for example, the uplink-side port 202 of #0. In the switching device 101, the switching unit 201 relays the packet to the downlink-side port 203 of #0 at which no failure is detected as illustrated by a dashed and single-dotted line arrow in FIG. 5A based on destination node information added to the packet. This is Operation VI in FIG. 5A. Accordingly, the packet normally arrives at another destination node (end node 102).

Figure 6:
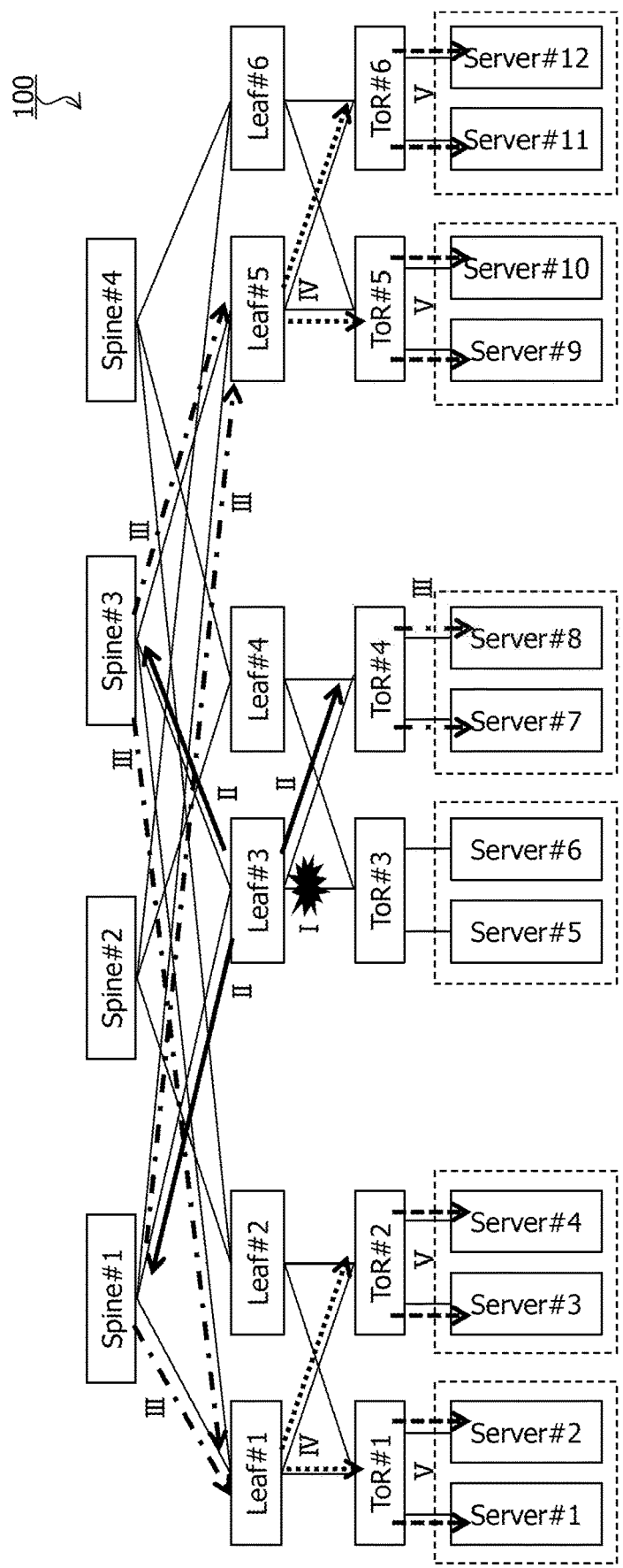
FIG. 6 is an explanatory diagram of an exemplary failure notification operation on a network.

FIG. 6 is an explanatory diagram of an exemplary failure notification operation of the network system 100 in FIG. 1 on a network based on the operation of the first switching device in FIG. 3A, the operation of the second switching device in FIG. 3B, and the operation of the end node 102 in FIG. 3C described above.

First, the failure detection unit 206 of the CPU 204 in the switching device 101 as Leaf #3, serving as the first switching device in FIG. 3A, detects a failure at the downlink-side port 203 of #0 as Leaf #3 coupled to the uplink-side port 202 of #0 of ToR #3. This is Operation I in FIG. 6. As a result, the failure information generating unit 207 of the CPU 204 of Leaf #3 generates, as information on nodes coupled to a failure spot, failure information including the failure affecting range indicated by the MAC addresses of Server #5 and Server #6. Then, the failure information relaying unit 208 of the CPU 204 of Leaf #3 notifies a failure notification packet including the failure information to another switching device 101 through the downlink-side port 203 of #1 as Leaf #3 other than the failure detected port and through the uplink-side ports 202 of #0 and #1. In the example in FIG. 6, Leaf #3 notifies the failure notification packet to Spine #1, Spine #3, and ToR #4.

The above-described transmission of the failure notification packet by Leaf #3 as the first switching device is a first-level failure notification. This notification follows a path indicated by a thick solid line arrow line II.

The following operation is executed by the failure information relaying unit 208 of the CPU 204 in Spine #1 having received the failure notification packet from the downlink-side port 203 of #1. The failure information relaying unit 208 transmits the received failure notification packet with no processing thereon to Leaf #1 and Leaf #5 through the downlink-side ports 203 of #0 and #2 other than the downlink-side port 203 of #1.

Similarly, the following operation is executed by the failure information relaying unit 208 of the CPU 204 in Spine #3 having received the failure notification packet from the downlink-side port 203 of #1. The failure information relaying unit 208 transmits the received failure notification packet with no processing thereon to Leaf #1 and Leaf #5 through the downlink-side ports 203 of #0 and #2 other than the downlink-side port 203 of #1.

The following operation is executed by the failure information relaying unit 208 of the CPU 204 in ToR #4 having received the failure notification packet from Leaf #3 through the uplink-side port 202 of #0. The failure information relaying unit 208 generates the selection-condition-added packet by adding, to the failure notification packet, the selection condition information indicating a selection condition that the uplink-side port 202 of #0 through which the failure notification packet has been received is selected by the load distribution mechanism described above. Then, the failure information relaying unit 208 transmits the selection-condition-added packet as a new failure notification packet to Server #7 and Server #8 through all of the downlink-side ports 203.

The above-described transmission of a failure notification packet by Spine #1 and Spine #3, or transmission of a failure notification packet with a selection condition added thereto by ToR #4 as the second switching device having received the failure notification packet from Leaf #3 as the first switching device is a second-level failure notification. This notification follows a path indicated by a thick dashed and single-dotted line arrow line III.

The following operation is executed by the failure information relaying unit 208 of the CPU 204 in Leaf #1 having received the failure notification packet from Spine #1 or Spine #3 through the uplink-side ports 202 of #0 and #1. The failure information relaying unit 208 generates the selection-condition-added packet by adding, to the failure notification packet, the selection condition information indicating a selection condition that the uplink-side ports 202 of #0 and #1 through which the failure notification packet has been received are selected by the load distribution mechanism described above. Then, the failure information relaying unit 208 transmits the selection-condition-added packet as a new failure notification packet to ToR #1 and ToR #2 through all of the downlink-side ports 203.

Similarly, the following operation is executed by the failure information relaying unit 208 of the CPU 204 in Leaf #5 having received the failure notification packet from Spine #1 or Spine #3 through the uplink-side ports 202 of #0 and #1. The failure information relaying unit 208 generates the selection-condition-added packet by adding, to the failure notification packet, the selection condition information indicating a selection condition that the uplink-side ports 202 of #0 and #1 through which the failure notification packet has been received are selected by the load distribution mechanism described above. Then, the failure information relaying unit 208 transmits the selection-condition-added packet as a new failure notification packet to ToR #5 and ToR #6 through all of the downlink-side ports 203.

The above-described transmission of a new failure notification packet with a selection condition added thereto by Leaf #1 or Leaf #5 as the second switching device having received the failure notification packet from Spine #1 or Spine #3 as the second switching device is a third-level failure notification. This notification follows a path indicated by a thick and smaller dashed line arrow line IV.

The following operation is executed by the failure information relaying unit 208 of the CPU 204 in ToR #1 having received the failure notification packet from Leaf #1 through the uplink-side port 202 of #0. the failure information relaying unit 208 generates the selection-condition-added packet by adding, to the failure notification packet, the selection condition information indicating a selection condition that the uplink-side port 202 of #0 through which the failure notification packet has been received is selected by the load distribution mechanism described above. Then, the failure information relaying unit 208 transmits the selection-condition-added packet as a new failure notification packet toward Server #1 and Server #2 through all of the downlink-side ports 203.

Similarly, the following operation is executed by the failure information relaying unit 208 of the CPU 204 in ToR #2 having received the failure notification packet from Leaf #1 through the uplink-side port 202 of #0. the failure information relaying unit 208 generates the selection-condition-added packet by adding, to the failure notification packet, the selection condition information indicating a selection condition that the uplink-side port 202 of #0 through which the failure notification packet has been received is selected by the load distribution mechanism described above. Then, the failure information relaying unit 208 transmits the selection-condition-added packet as a new failure notification packet toward Server #3 and Server #4 through all of the downlink-side ports 203.

Similarly, the following operation is executed by the failure information relaying unit 208 of the CPU 204 in ToR #5 having received the failure notification packet from Leaf #5 through the uplink-side port 202 of #0. The failure information relaying unit 208 generates the selection-condition-added packet by adding, to the failure notification packet, the selection condition information indicating a selection condition that the uplink-side port 202 of #0 through which the failure notification packet has been received is selected by the load distribution mechanism described above. Then, the failure information relaying unit 208 transmits the selection-condition-added packet as a new failure notification packet toward Server #9 and Server #10 through all of the downlink-side ports 203.

Similarly, the following operation is executed by the failure information relaying unit 208 of the CPU 204 in ToR #6 having received the failure notification packet from Leaf #5 through the uplink-side port 202 of #0. the failure information relaying unit 208 generates the selection-condition-added packet by adding, to the failure notification packet, the selection condition information indicating a selection condition that the uplink-side port 202 of #0 through which the failure notification packet has been received is selected by the load distribution mechanism described above. Then, the failure information relaying unit 208 transmits the selection-condition-added packet as a new failure notification packet toward Server #11 and Server #12 through all of the downlink-side ports 203.

The above-described transmission of a new failure notification packet with a selection condition added thereto by ToR #1, ToR #2, ToR #5, or ToR #6 as the second switching device having received the failure notification packet from Leaf #1 or Leaf #5 as the second switching device is a fourth-level failure notification. This notification follows a path indicated by a thick and larger dashed line arrow line V.

The following operation is executed by the failure analysis and path control unit 254 of the CPU 250 in each Server other than Server #5 and Server #6 detected as the failure affecting range at failure detection by Leaf #3, when having received a failure notification packet from a ToR at a higher level through the transmission-reception unit 252. The failure analysis and path control unit 254 generates, in the failure information table 255, an entry in which at least one link selection condition of the selection condition information in the received failure notification packet is associated with each destination node information included in the failure affecting range in the received failure notification packet.

In this manner, the failure detected by Leaf #3 may be notified to a Server other than Server #5 and Server #6 detected as its failure affecting range in a fixed time dependent on the number of network levels of Spine, Leaf, and ToR.

Figure 7:
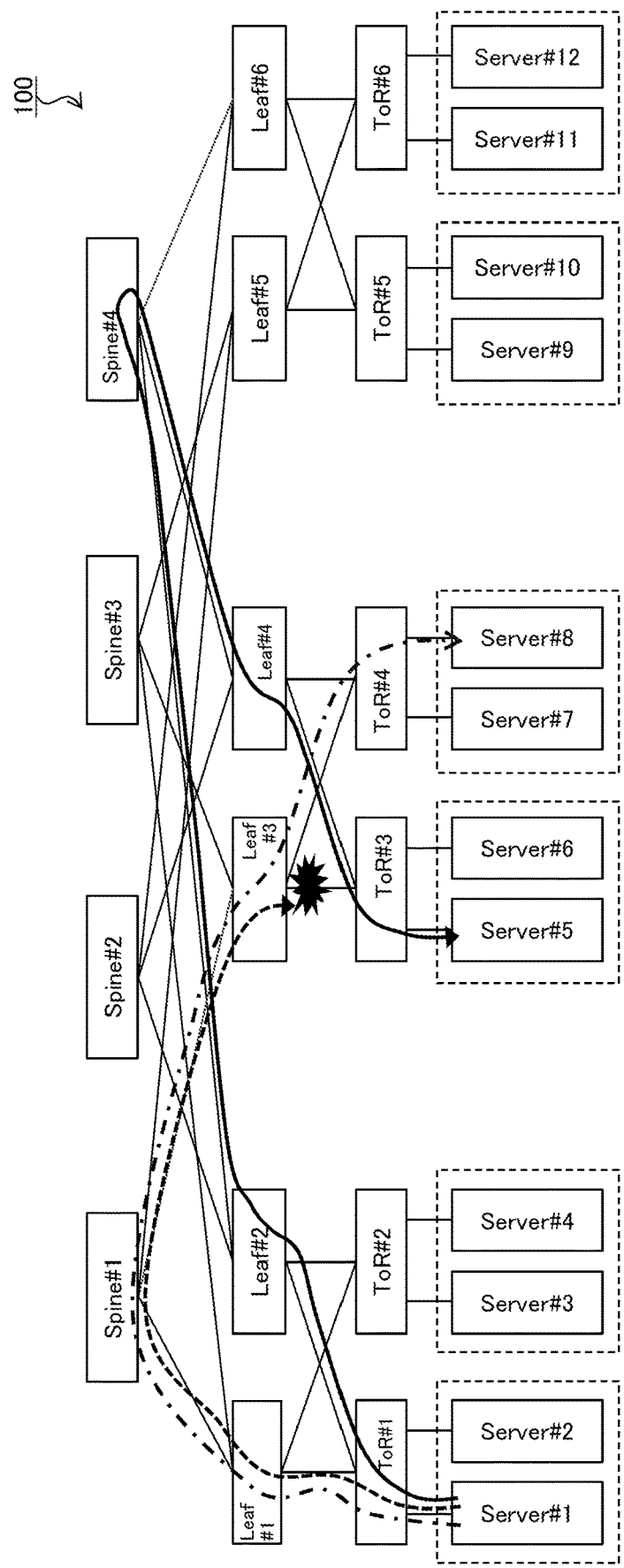
FIG. 7 is an explanatory diagram of an exemplary flow failure avoidance operation on a network.

FIG. 7 is an explanatory diagram of an exemplary failure avoidance operation on a flow on a network in the network system 100 in FIG. 1 based on the above-described operations in FIGS. 4A and 4B or FIGS. 5A, 5B, and 5C. FIG. 7 illustrates an operation after a failure notification packet corresponding to a failure detected through the downlink-side port 203 of Leaf #3 is notified to each Server other than Server #5 and Server #6 detected as the failure affecting range of the failure as described above with reference to FIG. 6.

When the header of a packet transmitted from Server #1 and addressed to Server #5 is not processed in transmission of the packet in a flow affected by a failure, the path of the packet is controlled as follows. The packet is relayed in the order of ToR #1→Leaf #1→Spine #1 (second switching devices) as illustrated by a dashed line arrow in FIG. 7, and then arrives at the downlink-side port 203 through which a failure is detected in Leaf #3 (first switching device) at which the failure is detected.

In the present embodiment, the packet transmitted from Server #1 and addressed to Server #5 in a flow affected by a failure has its header processed through Operation I→II-B→III→IV-B in FIG. 4B described above, and then is transmitted from the transmission-reception unit 252 of Server #1.

This packet is received by the downlink-side port 203 of ToR #1 (second switching device). Thereafter, the packet is sent by the load distribution mechanism of the switching unit 201 to, for example, the uplink-side port 202 that is coupled to Leaf #2 and different from the uplink-side port 202 on a path toward the switching device 101 at which the failure is detected (first switching device).

As a result, the packet is received by the downlink-side port 203 of Leaf #2, and then relayed to the uplink-side port 202 coupled to Spine #4 (or Spine #2) by the load distribution mechanism.

Accordingly, the packet is received by the downlink-side port 203 of Spine #4 (or Spine #2), and then relayed to the downlink-side port 203 coupled to Leaf #4 by a path control using the destination node table 209.

Then, the packet is received by the uplink-side port 202 of Leaf #4, and then relayed to the downlink-side port 203 toward ToR #3 by a path control using the destination node table 209 exemplarily illustrated in FIG. 10 described above.

Finally, the packet is received by the uplink-side port 202 of ToR #3 and then relayed to the downlink-side port 203 coupled to Server #5 by a path control using the destination node table 209, before arriving at Server #5.

In this manner, the path of the packet transmitted from Server #1 and having its header processed is controlled as indicated by a solid line arrow in FIG. 7. Specifically, the packet is relayed on a roundabout route in the order of ToR #1→Leaf #2→Spine #4 (or Spine #2)→Leaf #4→ToR #3, and then arrives at Server #5 as its destination.

As described with reference to FIG. 5, a packet transmitted from Server #1 and addressed to Server #8 in a flow not affected by a failure is transmitted from the transmission-reception unit 252 of Server #1 with no processing on the header of the packet (Operation II-A in FIG. 5C). As a result, as illustrated by a dashed and single-dotted line arrow in FIG. 7, the packet is relayed in the order of ToR #1→Leaf #1→Spine #1 and then arrives at Leaf #3 at which the failure is detected. In Leaf #3, based on destination node information added to the packet and addressed to Server #8, the packet received by the uplink-side port 202 is relayed to the downlink-side port 203 that is coupled to ToR #4 and at which no failure is detected as illustrated by the dashed and single-dotted line arrow. As a result, the packet is received by the uplink-side port 202 of ToR #4, and then relayed to the downlink-side port 203 coupled to Server #8, before arriving at Server #8 as illustrated by the dashed and single-dotted line arrow. In summary, FIG. 7 illustrates the failure avoidance operation on a flow on a network. Specifically, when a failure is detected at a downlink-side port of a switching device (Leaf #3), the switching device generates failure information, in other words, information on a group of nodes coupled to this failure port, and notifies a failure notification packet including this failure information to another switching device through a port other than the downlink-side port at which the failure is detected. When the other switching device receives the failure notification packet, the other switching device relays the failure notification packet to a packet other than a port at which the failure notification packet has received. The selection-condition-added packet obtained by adding a condition on selection as a relay point port to the failure notification packet is transmitted to a transmission node (Server #1). Then, the transmission node (Server #1) specifies a flow passing through a failure spot based on the selection condition information extracted from the selection-condition-added packet, and executes a path control so that the packet avoids the failure spot, in other words, a flow illustrated by a solid line in FIG. 7 is selected. A flow illustrated by a solid line is selected as communication from Server #1 to Server #5 avoiding a flow illustrated by a dotted line, in other words, a failure path. In Leaf #3, a flow passing through a downlink-side port other than a downlink-side port at which the failure is detected, in other words, a flow illustrated by a dashed line is used as a communication path from Server #1 to Server #8. As described above, in the present embodiment, specification and path change of a flow affected by a failure are executed.

Figure 8A:
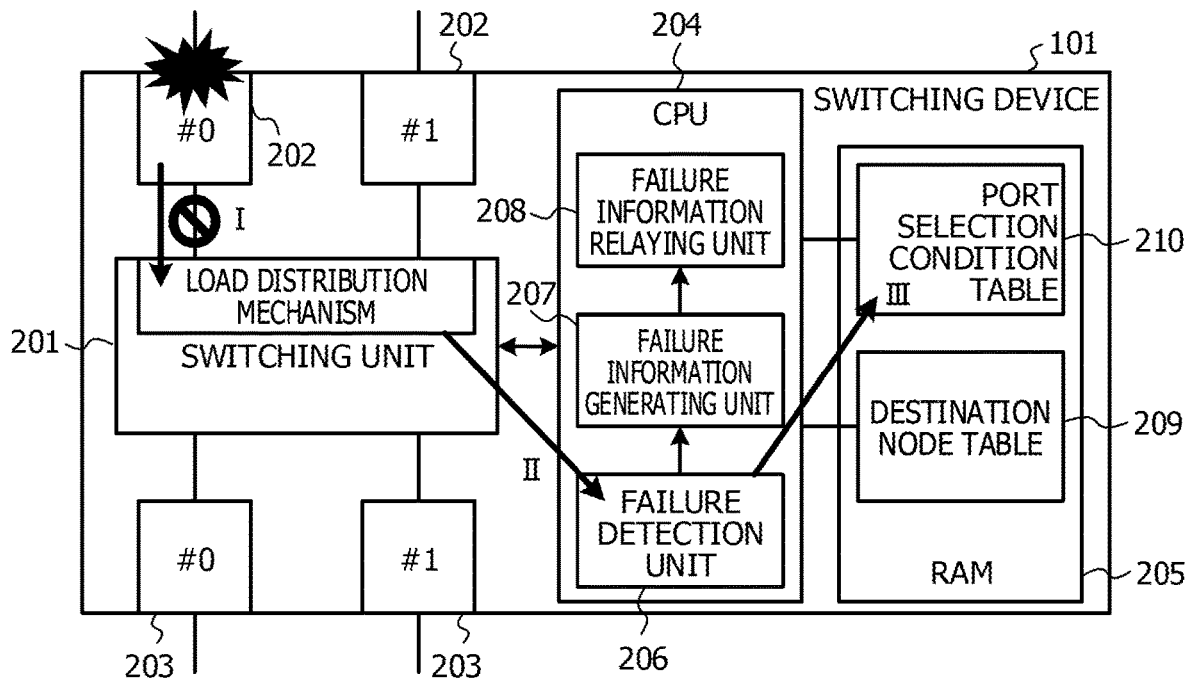
FIGS. 8A and 8B are each an explanatory diagram of an operation of the switching device at an uplink failure.
Figure 8B:
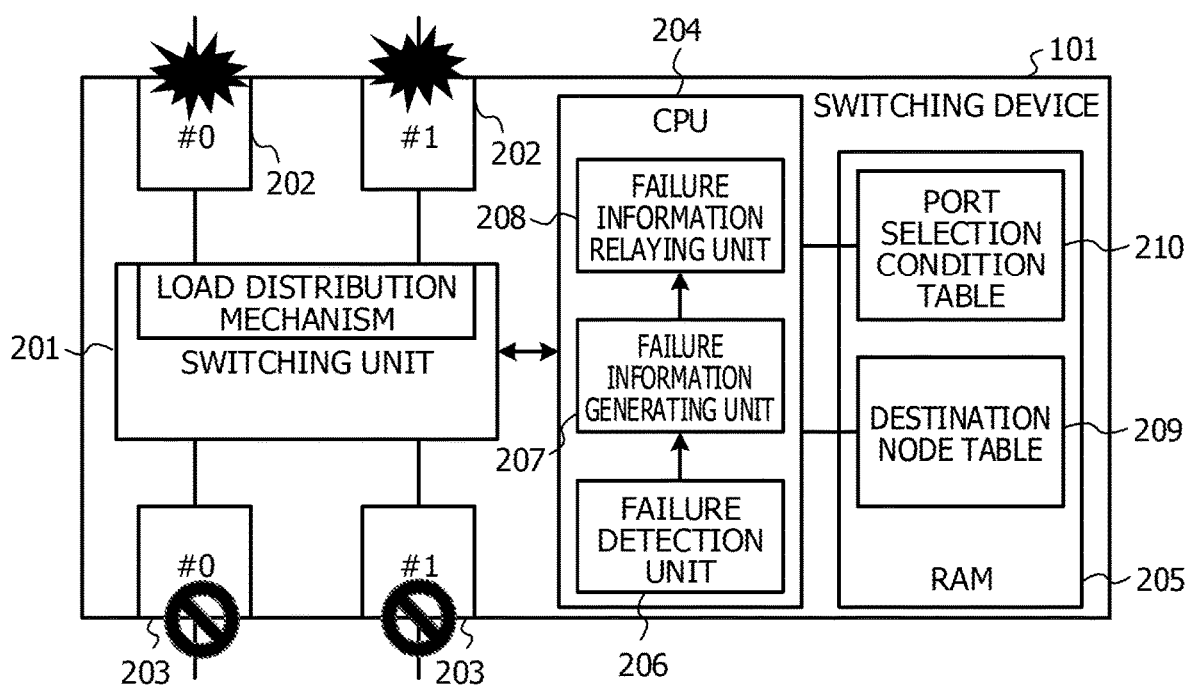

Next, in the present embodiment, an operation when a failure is detected at the uplink-side port 202 in the switching device 101 will be described. FIGS. 8A and 8B are each an explanatory diagram of an operation of the switching device 101 at an uplink failure. FIG. 8A corresponds to a case in which the failure is detected at some of the uplink-side ports 202. FIG. 8B corresponds to a case in which the failure is detected at all of the uplink-side ports 202.

The following first describes the case in which the failure is detected some of the uplink-side ports 202.

In the switching device 101, when a failure is detected at part, for example, #0 of the uplink-side port 202, this detection of the failure is notified to the load distribution mechanism. The load distribution mechanism restricts a relay to the uplink-side port 202 of #0 at which the failure is detected. (Operation I in FIG. 8A).

The load distribution mechanism notifies the failure to the failure detection unit 206 in the CPU 204 (Operation II in FIG. 8A). As a result, the failure detection unit 206 changes the content of the port selection condition table 210 in the RAM 205 to a condition after failure occurrence (Operation III in FIG. 8A).

Thereafter, the load distribution mechanism in the switching unit 201 executes the load distribution processing based on the content of the port selection condition table 210 after failure occurrence. Accordingly, a packet relayed to the uplink-side port 202 of #0 so far is relayed to the uplink-side port 202 of #1 before arriving at the end node 102 as a destination through another roundabout path.

The following describes the case in which a failure is detected all of the uplink-side ports 202.

In the switching device 101, when the failure is detected all ports, for example, #0 and #1 of the uplink-side port 202, this detection of the failure is notified to the CPU 204. In the switching device 101, all uplink paths may not be used, and thus the CPU 204 closes all of the downlink-side ports 203 of #0 and #1 so as to transmit the failure to another switching device 101 and an end node 102.

The following describes detailed operations for achieving the operations described above.

First, the load distribution mechanism (refer to FIG. 2A) in the switching unit 201 of the switching device 101 will be described. The load distribution mechanism calculates a hash value based on a packet received from the downlink-side port 203. Then, the load distribution mechanism controls the switching unit 201 to execute the load distribution processing of relaying the packet to the uplink-side port 202 corresponding to this calculation resultant value.

Specifically, having received a packet p through the downlink-side port 203, the load distribution mechanism calculates a hash value h corresponding to the packet p by an expression below.

$$h = H(p) \qquad (1)$$

In Expression (1) above, H is a function to calculate a hash value in accordance with a hash value calculation algorithm indicated by an Algorithm ID stored in the port selection condition table 210 in the RAM 205.

In addition, the load distribution mechanism acquires a link number M as the number of valid uplink-side ports 202 at which no failure is currently occurring from the port selection condition table 210 in the RAM 205 in FIG. 2A. The load distribution mechanism then calculates one of M valid uplink-side ports 202 by an expression below based on the hash value h calculated by Expression (1) and the link number M.

$$N = F(h, M) \qquad (2)$$

In this expression, F is a function to calculate one of values of 0 to M−1 in accordance with a calculation algorithm selected in advance. Typically, F may be a residue calculation function, and in this case, Expression (2) above is replaced with a residue calculation expression below.

$$N = H \% M \qquad (3)$$

The symbol % represents a residue calculation to calculate the residue of division of h by M. As a result, the load distribution mechanism calculates, for a received packet, a value N as one numerical value of the values of 0 to M−1.

The number of currently valid uplink-side ports 202 is equal to the link number M, the calculation resultant value N calculated by Expression (2) or (3) corresponds to any of the M values of 0 to M−1. Thus, the calculation resultant value N is recognized as the port number of the uplink-side port 202. The following describes a case in which the uplink-side port 202 having a particular port number may not be used due to, for example, a failure. To deal with such a case, the port selection condition table 210 in FIGS. 2A and 2B stores in advance a correspondence table of the port numbers of M currently valid uplink-side ports 202 and the M calculation resultant values N calculated by Expressions (1) and (2) (or (3)).

FIGS. 9A, 9B, and 9C each illustrate an exemplary configuration of the port selection condition table 210 stored in the RAM 205 in FIGS. 2A and 2B.

The port selection condition table 210 stores "Algorithm ID" illustrated in FIG. 9A. This Algorithm ID is algorithm identification information for specifying an algorithm for the hash function H in Expression (1) above and the function F in Expression (2) above. The Algorithm ID is notified to an end node 102 at a failure notification to be described later. In the example in FIG. 9A, the value of "1" is stored as the Algorithm ID. This indicates that the number of an algorithm used by the device in calculation of Expressions (1) and (2) is "1", more specifically, the identification number of a calculation program corresponding to the algorithm is "1".

Specific calculation of Expressions (1) and (2) described above is performed by various algorithms, and may be performed differently for each selection by a user and each switching device 101 (for example, Spine, Leaf, and ToR in FIG. 1). Thus, in the present embodiment, an algorithm for the load distribution mechanism on the uplink side is identified by the value of the Algorithm ID for uniquely specifying an algorithm in the network system 100. The algorithm is provided as, for example, a program code, and each switching device 101 has an algorithm (program code) corresponding to the Algorithm ID used by the switching device.

The port selection condition table 210 also stores the link number M illustrated in FIG. 9B. In the example in FIG. 9B, the value of m is stored as the link number M. The link number M is the number of valid ports at which no failure is occurring among the uplink-side ports 202 included in the switching device 101, and is frequently updated depending on a failure detection result of the uplink-side port 202 by the CPU 204. This processing will be described in detail later.

The port selection condition table 210 also stores data of the correspondence table illustrated in FIG. 9C. This correspondence table indicates a correspondence relation between the port numbers u1, u2, . . . , uM of M currently valid uplink-side ports 202 and the M calculation resultant values of 0, 1, . . . , M−1 calculated by Expressions (1) and (2) (or (3)). As described above with reference to FIG. 8A, the CPU 204 updates the content of the port selection condition table 210 in FIG. 2A each time a failure is detected at the uplink-side port 202. Specifically, the CPU 204 decrements the value of the link number M in FIG. 9B by one to delete an entry in the correspondence table in FIG. 9C corresponding to the port number of the uplink-side port 202 at which a failure is detected, and rearranges calculation results N of 0 to M−2. Accordingly, the load distribution mechanism may usually execute load distribution to valid uplink-side ports 202.

In this manner, the load distribution mechanism in the switching unit 201 reads the Algorithm ID (FIG. 9A) and the link number M (FIG. 9B) from the port selection condition table 210 in the RAM 205, and calls a calculation program corresponding to the Algorithm ID from the RAM 205. The load distribution mechanism executes calculation of Expressions (1) and (2) (or (3)) above by the calculation program with the link number M and the received packet p as inputs, so as to obtain the calculation result N. The load distribution mechanism determines a port number corresponding to the calculation result N based on the correspondence table (FIG. 9C) of the port selection condition table 210 in the RAM 205. The load distribution mechanism controls the switching unit 201 so as to relay the packet p received by the downlink-side port 203 to the uplink-side port 202 corresponding to the port number.

The port selection condition table 210 according to the present embodiment is also used when the switching device 101 (second switching device) has received a failure notification packet through the uplink-side port 202, as described above as Operation V in FIG. 3B. Specifically, the failure information relaying unit 208 of the CPU 204 in the second switching device acquires, from the port selection condition table 210, a link selection condition that the uplink-side port 202 through which the failure notification packet has been received is selected as a port for relaying the packet. Then, the failure information relaying unit 208 adds the acquired link selection condition as the selection condition information to the failure notification packet. Specifically, the failure information relaying unit 208 acquires, from the port selection condition table 210 having the exemplary configuration illustrated in FIG. 9, the selection condition information corresponding to the uplink-side port 202 of #1 through which the failure notification packet has been received. The selection condition information includes the link number M, the Algorithm ID as algorithm identification information, and a calculation resultant value corresponding to the uplink-side port 202 of #1 through which the failure notification packet has been received. Then, the failure information relaying unit 208 adds the acquired selection condition information to the failure notification packet. In other words, the failure information relaying unit 208 generates the selection-condition-added packet as a new failure notification packet.

In the above-described Operation III in FIG. 8A when a failure is detected at some of the uplink-side ports 202 in the switching device 101, the failure detection unit 206 changes the content of the port selection condition table 210 according to the present embodiment to a condition after failure occurrence. Specifically, the failure detection unit 206 decrements the value of the link number M in the port selection condition table 210 exemplarily illustrated in FIG. 9B by one to delete an entry in the correspondence table in FIG. 9C corresponding to the port number of the uplink-side port 202 of #0, and rearranges calculation results N of 0 to M−2.

In the present embodiment, in Area 2, the switching unit 201 of the switching device 101 executes a unique path control using the FDB when relaying a packet received through the uplink-side port 202 to the downlink-side port 203 as described above. Typically, the FDB stores, as a forwarding database, a correspondence relation between the MAC address of a transmission source node (end node 102) that performed transmission and reception of a packet in the past and the port number of a port through which the packet was received. Then, upon reception of a new packet, if the forwarding database stores the same MAC address as the destination MAC address of the packet, a port number stored together with the MAC address is acquired, and the packet is relayed to a port corresponding to this port number. The packet the destination MAC address of which is yet to be learned is relayed to the uplink-side port ("first area" relay method). A normal operation when an unlearned packet is received at the switch device as a Spine is disposal without a destination. The learning is performed only at a downlink-side port at a level before the Spine.

In reality, in order to avoid the disposal of a packet without being relayed when an end node corresponding to a destination MAC address exists, the FDB is registered through a controller or a learning packet is transmitted in advance from the end node.

In the present embodiment, as described above, a path control using the FDB is executed when a packet is relayed from the uplink-side port 202 to the downlink-side port 203. The learning of a correspondence relation between a MAC address and a port number is performed at the downlink-side port 203. In this manner, in the present embodiment, in a packet relay from the uplink-side port 202 to the downlink-side port 203, packets having the same destination are usually relayed to the same downlink-side port 203 when no failure occurs, and thus a unique path control is executed.

In the present embodiment, as described above, each end node 102 transmits a learning packet to each switching device 101 as a Spine so that the FDB is reliably set at the switching device 101. The switching device 101 receives this learning packet to learn a correspondence relation between a transmission source MAC address set to the learning packet and the downlink-side port 203 through which the learning packet has been received, and sets the correspondence relation to the forwarding database. The learning packet may be transmitted, for example, at coupling to the end node 102, or periodically.

FIG. 10 illustrates an exemplary configuration of the destination node table 209 stored in the RAM 205 in the switching device 101 illustrated in FIG. 2A in the present embodiment, for storing the correspondence relation between a MAC address and a port number.

Each entry at a memory address of 1, 2, . . . , L in the destination node table 209 stores a MAC address, a VLAN ID, and a Port Vector. When the port number starts at zero, the port number is indicated by a value of the Port Vector obtained by decrementing, by one, a value (for example, 1 to 36) corresponding to the bit position (for example, the first bit to the 36-th bit) of "1" in its binary number representation. This port number corresponds to a port to which a packet that has the MAC address stored in the entry as a destination MAC address and to which the VLAN ID stored in the entry is set is to be forwarded.

The value "1" may be set at a plurality of bit positions of the Port Vector to deal with a case in which a packet to which a destination MAC address and a VLAN ID are set is relayed to a plurality of ports. For example, the Port Vector of "1" in hexadecimal number representation, that is, "1" set to the first bit in binary number representation is registered at the memory address of "1" in FIG. 10. Accordingly, a packet having, as a destination MAC address and a VLAN ID, the MAC address of 00:01:02:03:04:05 and the VLAN ID of "1" stored at the memory address of "1" is relayed to a port with the port number of "0". The Port Vector of "2" in hexadecimal number representation, that is, "1" set to the second bit in binary number representation is registered at the memory address of "2". Accordingly, a packet having, as a destination MAC address and a VLAN ID, the MAC address of 00:01:02:03:04:06 and the VLAN ID of "10" stored at the memory address of "2" is relayed to a port with the port number of "1". The Port Vector of "1" set to the fifth bit is registered at the memory address of "3" because the hexadecimal number of "10" corresponds to "10000" in binary number representation. Accordingly, a packet having, as a destination MAC address and a VLAN ID, the MAC address of 00:01:02:03:04:07 and the VLAN ID of "1" stored at the memory address of "3" is relayed to a port with the port number of "4".

In FIG. 2A, having received a packet from the uplink-side port 202, the switching unit 201 searches the MAC address field in the destination node table 209 using the destination MAC address of the packet. Then, the switching unit 201 extracts, as a port number, the bit position of the Port Vector (binary number) of a matched entry, to which "1" is set. The switching unit 201 relays the packet to the downlink-side port 203 corresponding to the port number.

The above-described destination node table 209 is referred to by the failure information generating unit 207 of the CPU 204 in the first switching device, when determining the failure affecting range in Operation II in FIG. 3A described above. As exemplarily illustrated in FIG. 10, the destination node table 209 includes the MAC address of a destination node as destination node information. The failure information generating unit 207 extracts, for example, a Port Vector with "1" set to a bit position corresponding to the port number of "1" of the downlink-side port 203 at which a failure is detected from among Port Vectors stored in entries of the destination node table 209. Then, the failure information generating unit 207 acquires a MAC address stored in an entry corresponding to this Port Vector from the destination node table 209. A plurality of such entries may be simultaneously detected. Then, the failure information generating unit 207 generates failure information including at least one acquired MAC address as the failure affecting range (refer to a data configuration of failure information in FIG. 11 to be described later).

Specifically, the failure information generating unit 207 is notified by the failure detection unit 206, of the port number of "1" of the downlink-side port 203 at which a failure is detected. The failure information generating unit 207 shifts the value of "1" (binary number the first bit of which is "1") to the left by one bit corresponding to a port number at which a failure is detected. In other words, a calculation expressed as "1<<1" is executed. The symbol "<<" is the calculation sign of the left bit shift operation. The failure information generating unit 207 calculates the bitwise AND of the binary number of this calculation result and the binary number of the Port Vector at each entry of the destination node table 209. If the calculation result is not zero, that is, "1" is set to the second bit of the Port Vector at the entry corresponding to the port number at which the failure is detected, the failure information generating unit 207 extracts a Mac address stored at the entry as destination node information. For example, for the port number of "1" at which the failure is detected, shifting the value of "1" to the left by one bit obtains a binary number 00 . . . 10 with "1" set to the second bit. The value "1" is also set to the second bit of a binary number corresponding to the Port Vector of 0x000000002 at the memory address of "2" in the destination node table 209 exemplarily illustrated in FIG. 10. Thus, calculation of the bitwise AND of these binary numbers obtains a non-zero calculation result. Accordingly, the failure information generating unit 207 extracts the MAC address of 00:01:02:03:04:06 in the entry at the memory address of "2" as destination node information, and generates failure information including these MAC addresses as the failure affecting range.

Figure 11:
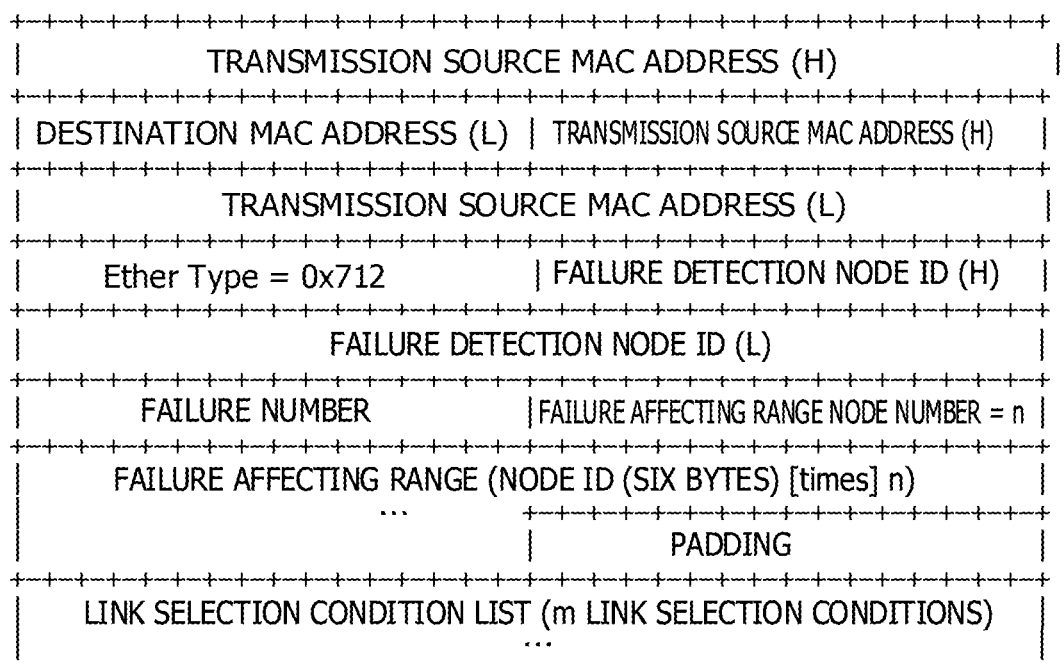
FIG. 11 illustrates an exemplary configuration of a failure notification packet.

FIG. 11 illustrates an exemplary configuration of a failure notification packet that is generated by the first switching device in FIG. 3A and to which the selection condition information is added by the second switching device in FIG. 3B. This exemplary configuration is an example in which the failure affecting range in failure information generated by the failure information generating unit 207 in the CPU 204 of the first switching device in FIG. 3A includes, as a node ID, a MAC address acquired from the exemplary configuration of the destination node table 209 exemplarily illustrated in FIG. 10. In this example, the MAC address has a data size of six bytes. Each field in the exemplary configuration of the failure notification packet in FIG. 11 is defined as follows.

"Destination MAC Address" is a reserved address indicating that the packet is a control packet. The destination MAC address is data of six bytes=48 bits in total including both a H bit group to which the symbol of "(H)" is added and an L bit group to which the symbol of "(L)" is added. As described above, since the failure notification packet is a packet broadcast toward each end node 102, the destination MAC address is set to the address indicating the control packet instead of the MAC address of a particular destination.

"Transmission Source MAC Address" is the MAC address of the switching device 101 (the first switching device in FIG. 3A and the second switching device in FIG. 3B) that generates or processes the failure notification packet. Similarly to the destination MAC address, the transmission source MAC address is data of six bytes=48 bits in total including both a H bit group to which the symbol of "(H)" is added and an L bit group to which the symbol of "(L)" is added. Each time the failure notification packet is relayed by the switching device 101, the transmission source MAC address is set to the MAC address of the switching device 101.

"Ether Type" is a reserved value (for example, 16 bits binary number data corresponding to the hexadecimal number of 0x712) of 16 bits indicating a failure notification. An arbitrary value may be set to "Ether Type" unless the value is identical to other values of "Ether Type".

"Failure Detection Node ID" is the MAC address of the switching device 101 at which the failure is detected (the first switching device in FIG. 3A). Similarly to the destination MAC address, "Failure Detection Node ID" is data of six bytes=48 bits including both a H bit group to which the symbol of "(H)" is added and an L bit group to which the symbol of "(L)" is added.

"Failure Number" is a 16-bit value allocated in order of failure occurrence in each switching device 101 (the first switching device in FIG. 3A) at which a failure is detected, and is used in identification when a plurality of failures occur.

"Failure Affecting Range Node Number=n" is a 16-bit value detected as the failure affecting range by the failure information generating unit 207 of the first switching device in FIG. 3A, and indicating the number of end nodes 102 coupled to the downlink-side port 203 at which a failure is detected.

"Failure Affecting Range" is the MAC address=node ID of each of n end nodes 102 coupled to the downlink-side port 203 at which a failure is detected, which is detected as the failure affecting range by the failure information generating unit 207 of the first switching device in FIG. 3A. Each node ID has a data size of six bytes. When six bytes×n is not divisible by 32 bits, paddings are inserted into trailing 16 bits.

"Link Selection Condition List" is a list of m link selection conditions added each time a failure notification packet transmitted from the first switching device in FIG. 3A passes through m second switching devices in FIG. 3B in the downlink direction on way to an end node 102. FIG. 12 illustrates a detailed exemplary configuration of the link selection condition list. In the link selection condition list, the link selection condition number=m is set to the higher 16 bits of the first 32 bits, and paddings are set to the lower 16 bits thereof. Following this, m sets of link selection conditions are set as the selection condition information, where each set has a size of 64 bits. The calculation resultant value N corresponding to the link number M and the uplink-side port 202 having received the failure notification packet, and the Algorithm ID as algorithm identification information are set as link selection conditions. As described with reference to FIG. 3A, these link selection conditions are acquired from the port selection condition table 210 in the RAM 205 and set by the failure information relaying unit 208 in the CPU 204 in the second switching device.

FIG. 13 illustrates an exemplary configuration of the failure information table 255 set by the failure analysis and path control unit 254 of the CPU 250 in the end node 102 and stored in the RAM 251 as described above with reference to FIG. 3C. This exemplary configuration is an example in which the failure affecting range included in failure information generated by the failure information generating unit 207 in the CPU 204 of the first switching device in FIG. 3A includes, as a node ID, a MAC address acquired from the exemplary configuration of the destination node table 209 exemplarily illustrated in FIG. 10. Having received a failure notification packet from the transmission-reception unit 252, the failure analysis and path control unit 254 of the CPU 250 in the end node 102 in FIG. 3C extracts n node IDs in the failure affecting range and m link selection conditions in the link selection condition list in the data exemplary configuration in FIG. 11. The failure analysis and path control unit 254 sets each extracted n node ID (MAC address) as a destination node ID at an entry with a memory address in the failure information table 255 stored in the RAM 205 having the data exemplary configuration in FIG. 13. The failure analysis and path control unit 254 sets the extracted m link selection conditions to condition fields of condition 1, condition 2, . . . for each of n entries with the memory addresses to which the n node IDs are set in the failure information table 255.

The failure information table 255 serves as a hash table with the node ID (MAC address) of each entry as a key.

The m condition fields of condition 1, condition 2, . . . in the entry correspond to the m link selection conditions added each time the failure notification packet passes through the m second switching devices in FIG. 3B in the downlink direction on way to the end node 102. The number of network levels in the network system 100 in FIG. 1 is represented by D. In this case, a maximum number Y of condition 1, condition 2, . . . set in the failure information table 255 is the number of levels each including the switching device 101 as the second switching device in FIG. 3B, that is, D−1 except for the network level of Spine. In the example in FIG. 1, the number of network levels is three of the Spine, Leaf, and ToR levels, and thus Y is 3−1=2 (condition 1 and condition 2) except for the network level of Spine.

In the failure information table 255 exemplarily illustrated in FIG. 13, n/a is a void value indicating an unused field or entry.

As exemplarily illustrated in FIG. 12, link selection conditions notified by a failure notification packet are the link number M, the Algorithm ID as algorithm identification information, and the calculation resultant value N corresponding to the uplink-side port 202 having received the failure notification packet in the second switching device. As exemplarily illustrated in FIG. 13, the failure information table 255 stores the condition fields of condition 1, condition 2, . . . for each destination node ID, and each condition field stores the calculation result N.

The following describes a case in which a failure notification packet is received by a plurality of the uplink-side ports 202 in the second switching device (refer to FIG. 3B) corresponding to one condition field. For example, in FIG. 6 described above, one failure notification packet transmitted from Leaf #3 at which a failure is detected is received at, for example, the uplink-side port 202 of #0 in Leaf #1 through Spine #1. Another failure notification packet transmitted from Leaf #3 at which the failure is detected is received at, for example, the uplink-side port 202 of #1 in Leaf #1 through Spine #3. In this case, the failure notification packets are received at the two uplink-side ports 202 of #0 and #1 in Leaf #1. Then, Leaf #1 as the second switching device adds a link selection condition that the uplink-side port 202 of #0 is selected, as the selection condition information to the failure notification packet received at the uplink-side port 202 of #0, and transmits the failure notification packet with the link selection condition added thereto from the downlink-side port 203. The calculation resultant value N of, for example, zero is added to the failure notification packet as the link selection condition that the uplink-side port 202 of #0 is selected. In addition, a node ID corresponding to Server #5 and a node ID corresponding to Server #6 are added to the failure notification packet as the failure affecting range. Leaf #1 also adds a link selection condition that the uplink-side port 202 of #1 is selected, as the selection condition information to the failure notification packet received at the uplink-side port 202 of #1, and transmits the failure notification packet with the link selection condition added thereto from the downlink-side port 203. The calculation resultant value N of, for example, one is added to the failure notification packet as the link selection condition that the uplink-side port 202 of #1 is selected. The node ID corresponding to Server #5 and the node ID corresponding to Server #6 are also added to the failure notification packet as the failure affecting range.

In FIG. 6, when two failure notification packets from Leaf #3 are received by the end node 102 as Server #1, the failure analysis and path control unit 254 of the CPU 204 (FIG. 3C) in Server #1 registers failure information to the failure information table 255 on the RAM 205. Specifically, the failure analysis and path control unit 254 first generates two entries corresponding to Server #5 and Server #6 and set as the failure affecting range to the two failure notification packets, in the failure information table 255 exemplarily illustrated in FIG. 13. The node ID corresponding to Server #5 set as the failure affecting range is set to one of the entries, and the node ID corresponding to Server #6 set as the failure affecting range is set to the other entry. Each node ID is, for example, a MAC address as described above with reference to FIG. 11.

Subsequently, the failure analysis and path control unit 254 sets, to one condition field in each entry, for example, a link selection condition set to the first received failure notification packet that the uplink-side port 202 of #0 of Leaf #3 is selected. Specifically, the link number M and the Algorithm ID corresponding to Leaf #3, and the calculation resultant value N of, for example, zero for selection of the uplink-side port 202 of #0 are registered in the condition field. These pieces of information are acquired from the data exemplarily illustrated in FIGS. 9A and 9B and the correspondence table exemplarily illustrated in FIG. 9C of the port selection condition table 210 in the RAM 205 in the second switching device in FIG. 3B as Leaf #3.

Subsequently, the failure analysis and path control unit 254 sets, to the same condition field in each entry, for example, a link selection condition set to the second received failure notification packet that the uplink-side port 202 of #1 of Leaf #3 is selected. Specifically, the link number M and the Algorithm ID corresponding to Leaf #3 in the condition field are the same as those registered for the first failure notification packet. In addition, the calculation resultant value N of, for example, one for selection of the uplink-side port 202 of #1 is registered over the condition field. The calculation resultant value N is acquired from the correspondence table exemplarily illustrated in FIG. 9C of the port selection condition table 210 in the RAM 205 in the second switching device in FIG. 3B as Leaf #3.

Figures 14A, 14B, 14C:
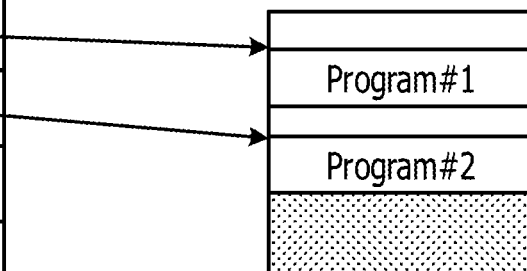
FIGS. 14A, 14B, and 14C each illustrate detailed exemplary configuration of a condition field.

As described above, the link number M and the Algorithm ID are the same for one condition field in entries corresponding to the same destination node ID, but a plurality of the calculation resultant values N are registered for the condition field. FIGS. 14A, 14B, and 14C each illustrate a detailed exemplary configuration of the condition fields of condition 1, condition 2, . . . of each entry of the failure information table 255 exemplarily illustrated in FIG. 13, which is applicable to the above-described case. As illustrated in FIG. 14A, in addition to the link number M and the Algorithm ID, the Port Vector of the calculation resultant value N instead of the simple calculation resultant value N is stored in a condition field. The Port Vector is a binary number (displayed in a hexadecimal number in FIG. 14A) obtained through the left bit shift operation on the value of "1" (binary number the first bits of which is "1") by the number of bits corresponding to the calculation resultant value N. In other words, the Port Vector is a result of a calculation expressed as 1<<N. In registration of a plurality of the calculation resultant values N, a new Port Vector is calculated as the bitwise OR of a binary number obtained through the left bit shift operation on the value of "1" by the number of bits corresponding to a newly received calculation resultant value N, and the binary number of a previously obtained Port Vector. A calculation expressed as PV_new=PV|(1<<N) is executed, where PV represents the Port Vector before an update and PV_new represents the Port Vector after the update. The symbol | is the sign of the bitwise OR calculation. The Port Vector has an initial value of all zeros. Thus, at least one bit position of the Port Vector to which "1" is set corresponds to at least one calculation resultant value N in a condition field in which the Port Vector is stored.

The RAM 251 in the end node 102 stores a table data in FIG. 14B. This table data includes an entry in which a pointer to a memory area in FIG. 14C that stores the calculation program codes of Program #1, Program #2, . . . is associated with each of the values 1, 2, 3, . . . , N of the algorithm ID.

As described above with reference to FIG. 4B, if an entry to which a destination node ID identical to a destination node ID set to a packet is set is found in the failure information table 255 before the packet is transmitted, the failure analysis and path control unit 254 executes the following control operation.

The failure analysis and path control unit 254 executes the following calculation and determination for a link selection condition in each condition field stored in the entry specified in the failure information table 255 exemplarily illustrated in FIG. 13.

For example, for condition 1 of an entry with memory address 1 in FIG. 13, the failure analysis and path control unit 254 executes the calculation "F(H(p), M)" (refer to Expressions (1) and (2) described above) of the link selection condition of condition 1 for the packet p, and obtains a calculation result n. Specifically, the failure analysis and path control unit 254 extracts the algorithm ID in FIG. 14A from the field of condition 1 of the entry in the failure information table 255. Then, the failure analysis and path control unit 254 calls, from the table data in FIG. 14B, a calculation program code Program #1 in FIG. 14C corresponding to the extracted algorithm ID and stored in the RAM 205. The failure analysis and path control unit 254 extracts the link number M in FIG. 14A from the field of condition 1 of the entry of the failure information table 255. The failure analysis and path control unit 254 executes calculations of the above-described Expressions (1) and (2) (or (3)) by executing the calculation program code Program #1 with the transmission packet p and the link number M as inputs, so as to calculate the calculation result n.

The Port Vector in FIG. 14A is extracted from the field of condition 1 of the entry of the failure information table 255. The failure analysis and path control unit 254 calculate the bitwise AND of a binary number obtained through the left bit shift operation on the value of "1" (binary number the first bits of which is "1") by the number of bits corresponding to the calculation result n, and the binary number of the Port Vector. In other words, a calculation expressed as PV & (1<<N) is executed, where PV represents the Port Vector. The symbol & is the sign of the bitwise AND calculation.

The failure information generating unit 207 determines that the transmission packet p matches the link selection condition of condition 1, if the calculation provides a non-zero result, that is, the value "1" is set to the bit position of the Port Vector of the field of condition 1 corresponding to the calculation result n.

The end node 102 as a transmission node may store in advance a plurality of the calculation program codes exemplarily illustrated in FIG. 14C of a calculation algorithm corresponding to the link selection condition of the switching device 101 (second switching device) for an end node 102 to perform the calculation. Alternatively, the calculation program codes may be distributed from each switching device 101 to each end node 102 at initialization of the network system 100 in FIG. 1.

The following describes an example of specific control processing to deal with a failure, executed by the embodiment having the above-described configuration.

Figure 15:
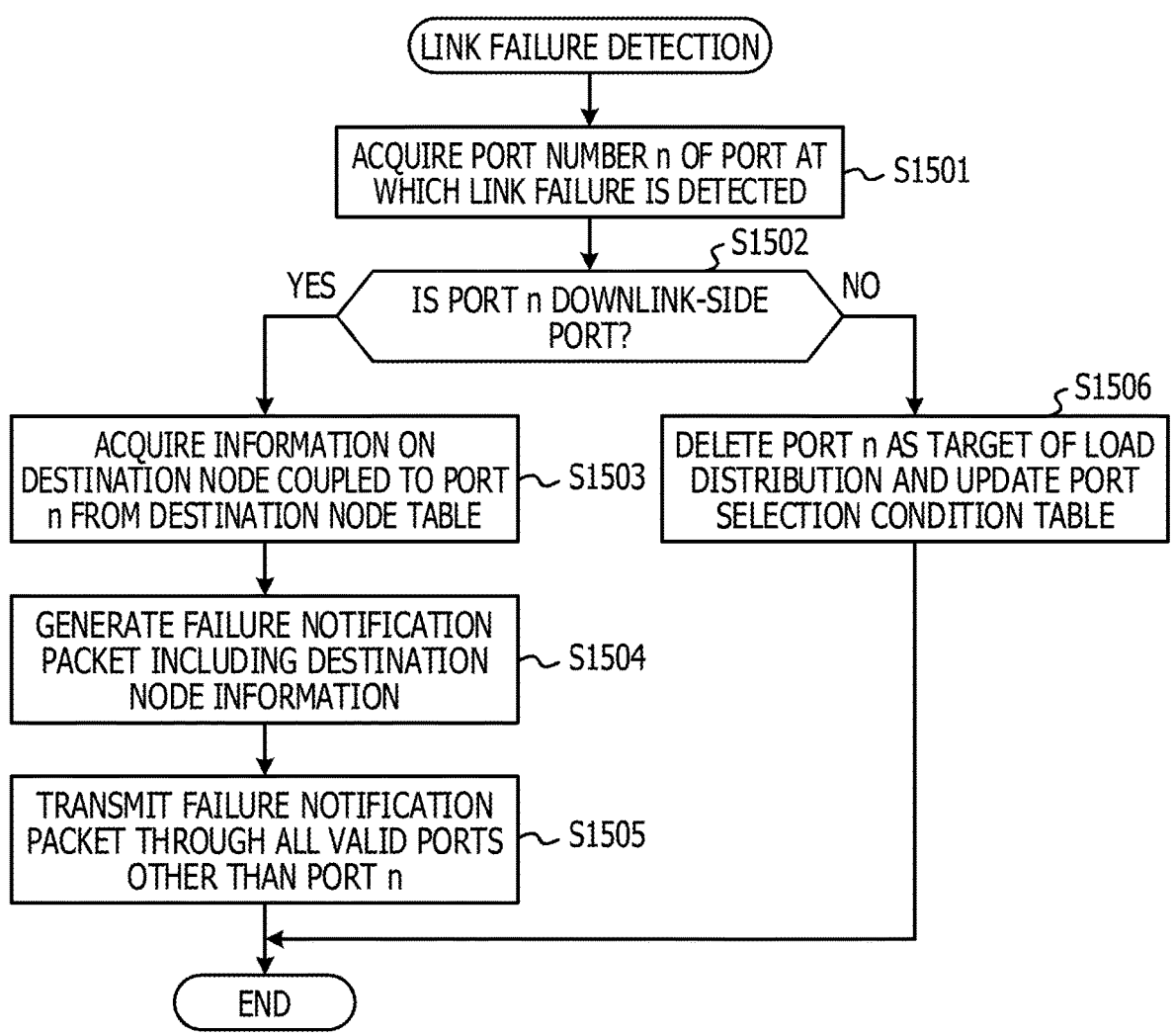
FIG. 15 is a flowchart of exemplary processing of a failure information generating unit in a first switching device.

FIG. 15 is a flowchart of exemplary link failure detection processing executed by the CPU 204 in the first switching device in FIG. 3A described above. This processing is, for example, an operation in which the CPU 204 executes a failure information generation processing program stored in a ROM (read-only memory) not particularly illustrated. This processing is activated when the failure detection unit 206 as a function executed by the CPU 204 detects a failure occurring at one of the downlink-side ports 203 in the first switching device (Operation I in FIG. 3A). The link failure detection processing corresponds to part of the failure information generating unit 207 and the failure information relaying unit 208, as a function executed by the CPU 204 in the switching device 101 in FIG. 2A.

First, the CPU 204 acquires the port number n of a port at which a link failure is detected (step S1501).

Next, the CPU 204 determines whether the port with the port number n is the downlink-side port 203 in FIG. 3A (step S1502).

If the determination at step S1501 provides YES (the downlink-side port 203), the CPU 204 acquires information on a destination node coupled to the downlink-side port 203 with the port number n from the destination node table 209 in FIG. 3A (step S1503). This operation is described in detail above in the description of Operation II in FIG. 3A.

Next, the CPU 204 generates a failure notification packet including the destination node information acquired at step S1503 (step S1504). The failure notification packet has the data configurations exemplarily illustrated in FIGS. 11 and 12 described above.

Then, the CPU 204 transmits the failure notification packet generated at step S1504 through all of the downlink-side ports 203 other than the downlink-side port 203 with the port number n and through the uplink-side port 202 (step S1505). This operation is described above in detail as path III in FIG. 3A.

If the determination at step S1501 provides NO (the uplink-side port 202), the CPU 204 deletes the port with the port number n as a target of load distribution by the load distribution mechanism in the switching unit 201, and updates the port selection condition table 210 in the RAM 205 (step S1506). This operation is described above in detail with reference to FIG. 8.

After the processing at step S1505 or S1506, the CPU 204 ends the link failure detection processing illustrated by the flowchart in FIG. 15.

Figure 16:
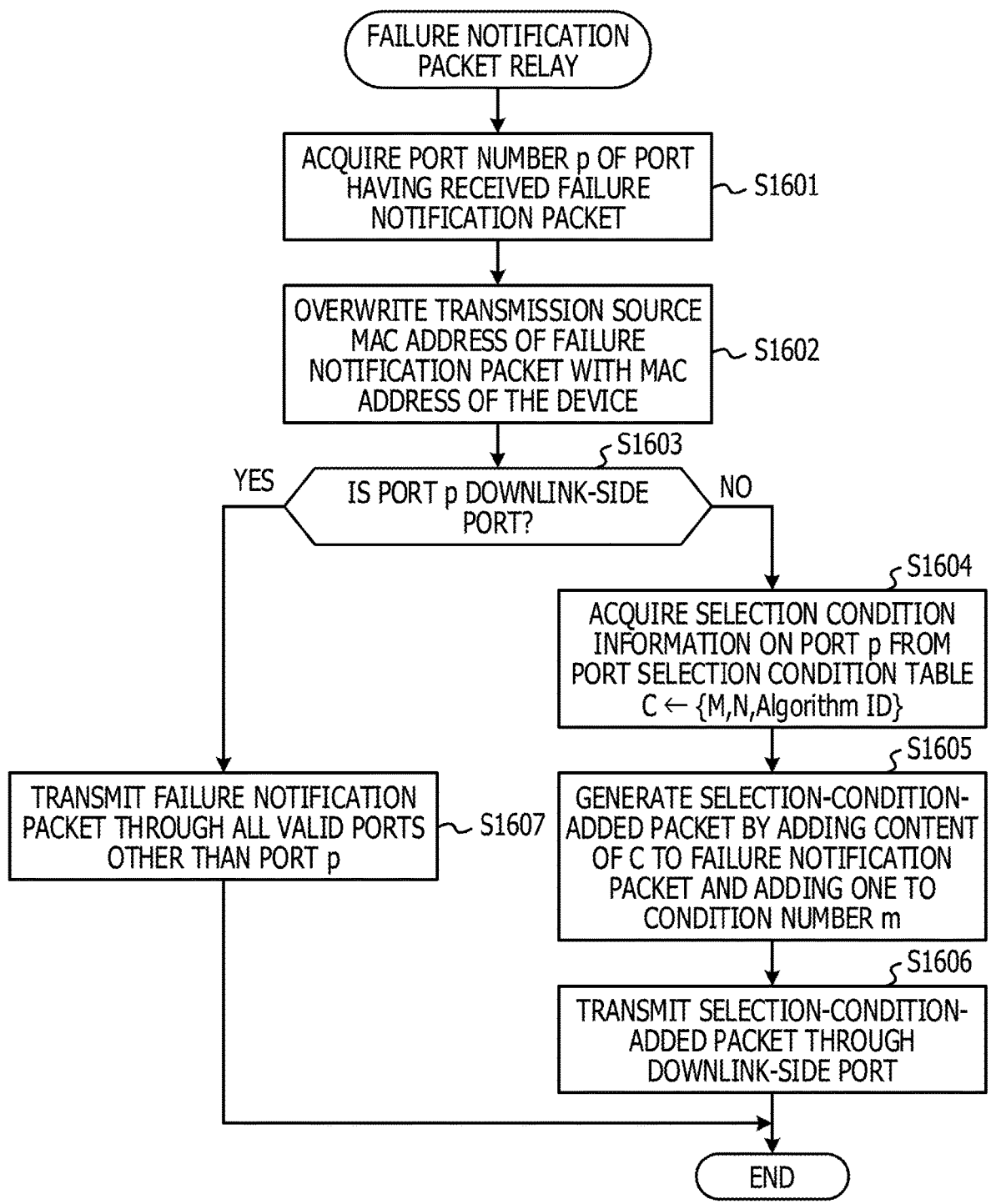
FIG. 16 is a flowchart of exemplary failure notification packet relay processing in a second switching device.

FIG. 16 is a flowchart of exemplary failure notification packet relay processing executed by the CPU 204 in the second switching device in FIG. 3B described above. This processing is, for example, an operation in which the CPU 204 executes a failure notification packet relay processing program stored in the ROM not particularly illustrated. This processing is activated when a failure notification packet is received at any of the ports of the second switching device (for example, Operation IV in FIG. 3B). When, in the header of a received packet, the destination MAC address is a reserved address indicating a control packet and the Ether Type indicates a failure notification (refer to FIG. 11), the switching unit 201 in FIG. 3B passes the packet as a failure notification packet to the CPU 204. The failure notification packet relay processing corresponds to part of the failure information relaying unit 208 as a function executed by the CPU 204 in the switching device 101 in FIG. 2A.

First, the CPU 204 acquires the port number p of a port having received a failure notification packet (step S1601).

Next, the CPU 204 overwrites the transmission source MAC address of the failure notification packet with the MAC address of the switching device (step S1602).

Subsequently, the CPU 204 determines whether the port with the port number p is the downlink-side port 203 (step S1603).

If the determination at step S1603 provides NO (the uplink-side port 202), the CPU 204 acquires a selection condition corresponding to the port number p from the port selection condition table 210 in FIG. 3B, and stores the selection condition in an array C in the RAM 205 (step S1604). This processing is described above in detail as Operation V in FIG. 3B. As described above, the selection condition acquired from the port selection condition table 210 exemplarily illustrated in FIG. 9 includes the link number M, the calculation resultant value N, and the Algorithm ID.

Next, for the failure notification packet received and provided with the processing at step S1602 and having the configuration exemplarily illustrated in FIG. 11, the CPU 204 stores the content of the link selection condition in the array C in the field of the link selection condition list in a format exemplarily illustrated in FIG. 12. The CPU 204 also adds one to the value m of the field of the link selection condition number in FIG. 12. The CPU 204 sets the resulting packet as the selection-condition-added packet described above (the above processing corresponds to step S1605). This processing is described above in detail as Operation V in FIG. 3B.

Thereafter, the CPU 204 sends the selection-condition-added packet generated at step S1605, as a new failure notification packet, through the downlink-side port 203 (step S1606). This processing is described above in detail as Operation VI in FIG. 3B.

If the determination at step S1603 provides YES (the downlink-side port 203), the CPU 204 executes the following processing. The CPU 204 transmits the received failure notification packet without the selection condition information added thereto through all valid downlink-side ports 203 other than the downlink-side port 203 having received the failure notification packet, and the uplink-side port 202 (step S1607).

After the processing at step S1606 or S1607, the CPU 204 ends the failure notification packet relay processing illustrated by the flowchart in FIG. 16.

Figure 17:
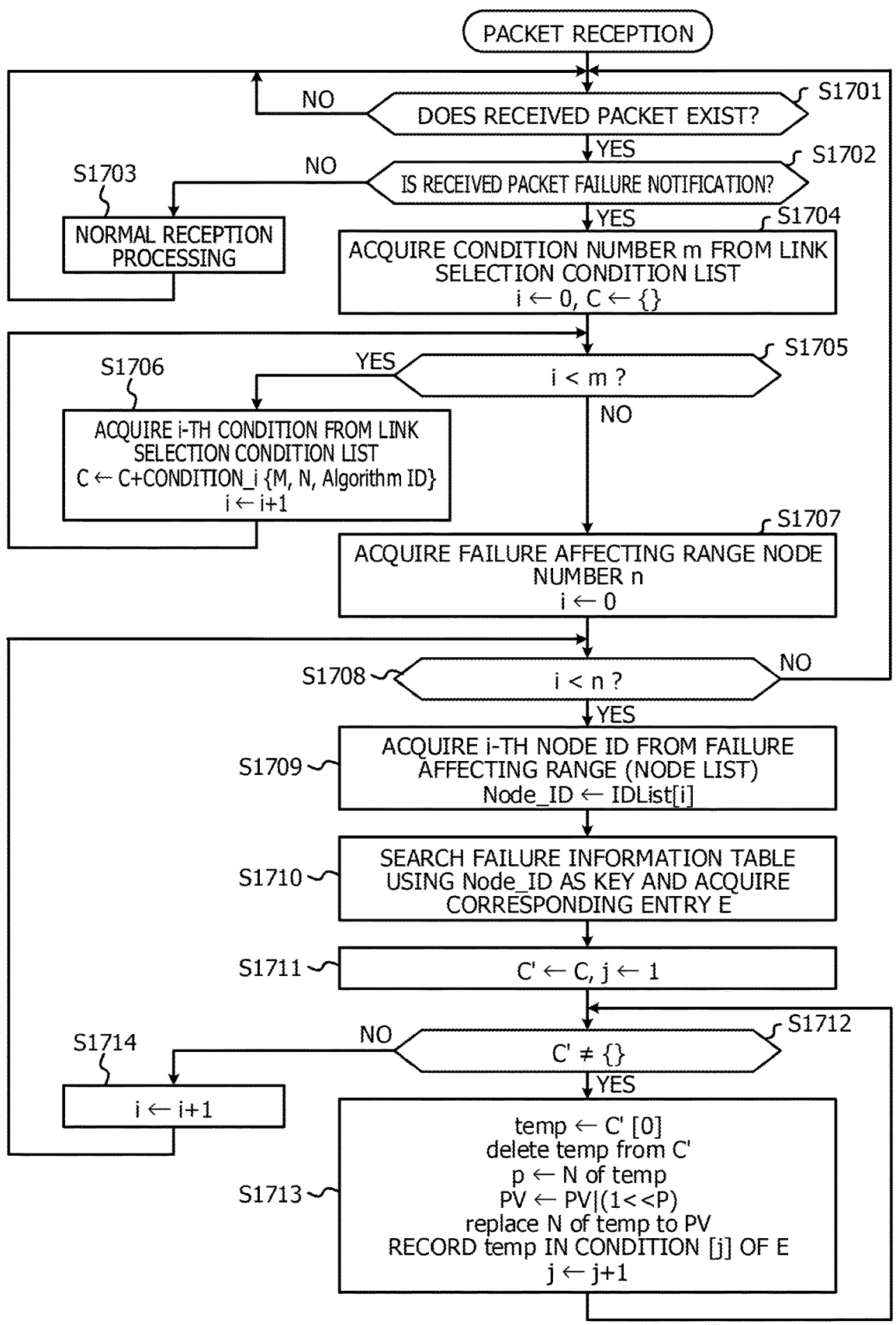
FIG. 17 is a flowchart of exemplary packet reception processing in the end node.

FIG. 17 is a flowchart of exemplary packet reception processing executed by the CPU 250 in an end node 102 in FIG. 3C described above. This processing is, for example, an operation in which the CPU 250 executes a packet reception processing program stored in the ROM not particularly illustrated. This processing is usually in an activated state.

Normally, the CPU 250 repeatedly executes determination of whether a received packet exists in the transmission-reception unit 252 in FIG. 3C (repetition of the determination with NO at step S1701).

If the determination at step S1701 provides YES, the CPU 250 determines whether the received packet is a failure notification packet (step S1702). When, in the header of the received packet, the destination MAC address is a reserved address indicating a control packet and the Ether Type indicates a failure notification (refer to FIG. 11), the CPU 250 determines that the packet is a failure notification packet.

If the determination at step S1702 provides NO (the packet is not a failure notification packet), the CPU 250 executes normal packet reception processing not particularly illustrated (step S1703). Thereafter, the CPU 250 returns control to the reception waiting processing at step S1701.

If the determination at step S1702 provides YES (the packet is a failure notification packet), the CPU 250 executes a set of pieces of processing following step S1704. This set of pieces of processing corresponds to an operation of the failure analysis and path control unit 254 of the CPU 250 in FIG. 3C.

First, the CPU 250 acquires the condition number m exemplarily illustrated in FIG. 12 from the link selection condition list exemplarily illustrated in FIG. 12 in the received failure notification packet exemplarily illustrated in FIG. 11. Thereafter, the CPU 250 stores an initial value of zero in a variable i in the RAM 251 for counting link selection conditions in the link selection condition list. The CPU 250 also empties the content of an array variable C in the RAM 251 for storing the link selection conditions (the above processing corresponds to step S1704).

Thereafter, the CPU 250 determines whether the variable i has a value smaller than the value m (step S1705).

If the determination at step S1705 provides YES, the CPU 250 acquires the i-th link selection condition {M, N, Algorithm ID} indicated by the value of the variable i from the link selection condition list exemplarily illustrated in FIG. 12 in the received failure notification packet exemplarily illustrated in FIG. 11. As described above with reference to FIG. 12, M represents the link number, N represents the calculation resultant value, and the Algorithm ID is algorithm identification information. The CPU 250 adds the acquired link selection condition {M, N, Algorithm ID} as a new element of the array variable C to the array variable C. Then, the CPU 250 increments the value of the variable i by one (the above processing corresponds to step S1706).

Thereafter, the CPU 250 returns to the determination at step S1705, and repeats acquisition of the next i-th link selection condition if the determination provides YES.

If the repetition of the above processing completes acquisition of m link selection conditions of the zero-th to (m−1)-th link selection conditions from the link selection condition list in the received failure notification packet into the array variable C, the determination at step S1705 provides NO.

Thereafter, the CPU 250 acquires the failure affecting range node number n from the received failure notification packet exemplarily illustrated in FIG. 12. Then, the CPU 250 stores an initial value of zero in the variable i (step S1707).

The CPU 250 executes the series of processing at steps S1709 to S1713 until it is determined at step S1708 that the variable i has a value smaller than the failure affecting range node number n acquired at step S1707 while the value of the variable i is incremented by one at step S1714.

If the determination at step S1708 provides YES, the CPU 250 executes the following processing. The CPU 250 acquires the node ID of an i-th element IDList[i] indicated by the value of the variable i from the failure affecting range (node list) in the received failure notification packet exemplarily illustrated in FIG. 12, which is obtained in an array variable IDList[ ] in the RAM 251. Then, the CPU 250 stores the node ID in a variable Node_ID in the RAM 251 (the above processing corresponds to step S1709).

Next, the CPU 250 searches the failure information table 255 exemplarily illustrated in FIG. 13, using the node ID stored in the variable Node_ID as a key, so as to acquire an entry in which a value identical to the node ID is stored as a destination node ID. If no entry is stored, the CPU 250 newly generates, in the failure information table 255, an entry in which the node ID is set as a destination node ID. Then, the CPU 250 stores a pointer to this entry in a variable E in the RAM 251 (the above processing corresponds to step S1710).

Next, the CPU 250 moves the m link selection conditions stored in the array variable C by the repetition processing at step S1706 to an array variable C' in the RAM 251, and stores an initial value of one in a repetition control variable j in the RAM 251 (the above processing corresponds to step S1711).

Thereafter, the CPU 250 determines whether the array variable C' has an empty element (C'≠{ }) (step S1712).

If the array variable C' does not have an empty element (the determination at step S1712 provides YES), the CPU 250 executes the following processing. The CPU 250 first stores the link selection condition {M, N, Algorithm ID} as the leading element C'[0] of the array variable C' in a temporal variable "temp" in the RAM 251. Next, the CPU 250 deletes the leading element corresponding to the temporal variable "temp" from the array variable C' ("delete temp from C'" in FIG. 17). Next, the CPU 250 extracts the calculation resultant value N from the link selection condition {M, N, Algorithm ID} stored in the temporal variable "temp", and stores the calculation resultant value N in a variable p in the RAM 251 ("p←N of temp" in FIG. 17). Next, as described above with reference to FIG. 14A, the CPU 250 performs the left bit shift operation on the value of "1" by the number of bits corresponding to a calculation resultant value p (=N) stored in the variable p. In other words, a calculation expressed as "1<<p" is executed. The CPU 250 sets, as a new PV value, a result of the bitwise OR calculation of the binary number of the calculation result and the binary number of a Port Vector (PV) stored in advance in an entry of the failure information table 255 pointed by the variable E generated at step S1710. In other words, a calculation expressed as "PV←PV|(1<<p)" is executed. Then, the CPU 250 replaces, with the new PV value, the calculation resultant value N in the link selection condition {M, N, Algorithm ID} stored in the temporal variable "temp" ("replace N of temp to PV" in FIG. 17). As a result, the content of the temporal variable "temp" is set to the link selection condition {M, PV, Algorithm ID}. The CPU 250 records (overwrites) the link selection condition {M, PV, Algorithm ID} of the temporal variable "temp" onto the j-th condition j indicated by the value of the variable j in an entry pointed by the variable E in the failure information table 255 exemplarily illustrated in FIG. 13 in the RAM 251. Finally, the CPU 250 increments the value of the variable j by one (the above processing corresponds to step S1713).

Thereafter, the CPU 250 returns to the determination processing at step S1712, and repeats the processing at step S1713 while the array variable C' has a link selection condition element.

If, as a result of the above-described repetition processing, the array variable C' has an empty element and thus the determination at step S1712 provides NO, the CPU 250 increments the value of the variable i by one (step S1714), and then returns to the determination processing at step S1708. If any other unprocessed node ID notified as the failure affecting range remains, the series of processing at steps S1709 to S1713 is executed again for the node ID so that the content of the failure information table 255 is updated.

If the processing to update the failure information table 255 is completed for all node IDs notified as the failure affecting range and thus the determination at step S1708 provides NO, the CPU 250 returns to the reception waiting processing at step S1701.

Figure 18:
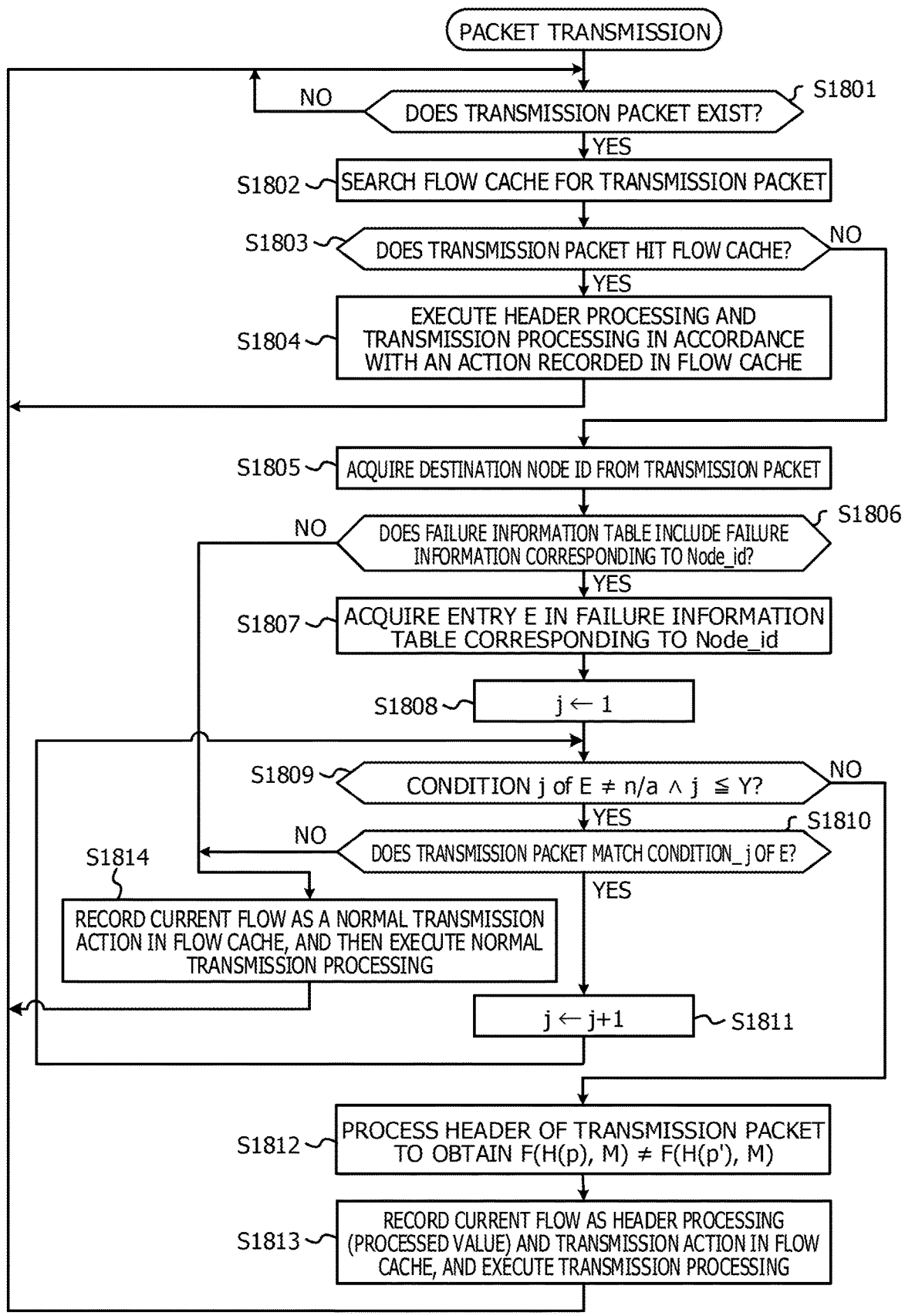
FIG. 18 is a flowchart of exemplary packet transmission processing in the end node.

FIG. 18 is a flowchart of exemplary packet transmission processing executed by the CPU 250 in an end node 102 in FIG. 4B described above. This processing is, for example, an operation in which the CPU 250 executes a packet transmission processing program stored in the ROM not particularly illustrated. This processing is usually in an activated state.

Normally, the CPU 250 repeatedly executes the determination in FIG. 4B of whether a transmission packet exists (repetition of the determination with NO at step S1801).

If the determination at step S1801 provides YES, the CPU 250 searches a flow cache in the RAM 251 for the transmission packet (step S1802). In the present embodiment, processing on a transmission packet of an identical kind executed in the past is stored as a flow cache in the RAM 251.

The CPU 250 determines whether the transmission packet hits the flow cache (step S1803).

If the determination at step S1803 provides YES (hit), the CPU 250 executes processing (to be described later) of the header of the transmission packet and transmission processing in accordance with an action recorded in the flow cache (step S1804). Thereafter, the CPU 250 returns to the waiting processing of the transmission packet at step S1801.

If the determination at step S1803 provides NO (no hit), the CPU 250 acquires a destination node ID from the transmission packet and stores the destination node ID in the variable Node_ID in the RAM 251 (step S1805).

Then, the CPU 250 determines whether the failure information table 255 exemplarily illustrated in FIG. 13 in the RAM 251 includes an entry of failure information storing the same destination node ID as the value of the variable Node_ID (step S1806).

The processing at steps S1805 and S1806 is described above in detail as Operation I by the destination check unit 253 of the CPU 250 in FIG. 4B.

If the determination at step S1806 provides NO, the CPU 250 records the current flow as a normal transmission action on the transmission packet in the flow cache in the RAM 251, and then executes normal transmission processing not particularly illustrated (step S1814). This processing is described above as Operation II-A by the destination check unit 253 of the CPU 250 in FIG. 4B. Thereafter, the CPU 250 returns to the waiting processing of the transmission packet at step S1801.

If the determination at step S1806 provides YES, the CPU 250 acquires an entry E storing a destination node ID corresponding to the value of the variable Node_ID from the failure information table 255 exemplarily illustrated in FIG. 13 (step S1807).

Next, the CPU 250 stores an initial value of one in the repetition control variable j in the RAM 251 for processing each condition field in the entry E (step S1808).

Next, the CPU 250 determines whether the content of the j-th condition j indicated by the value of the variable j in the entry E is not the void value n/a described with reference to FIG. 13 and the value of the variable j is equal to or smaller than the maximum number Y of condition fields described with reference to FIG. 13 (step S1809). At step S1809 in FIG. 18, this is represented as "Condition_j of E≠n/a^j≤Y".

If the determination at step S1809 provides YES, the CPU 250 determines whether the transmission packet matches the condition j ("Condition_j of E" in FIG. 18) in the entry E (step S1810). This matching processing is described above as Operation III by the failure analysis and path control unit 254 of the CPU 250 in FIG. 4B in detail with reference to FIG. 14.

If the determination at step S1810 provides NO, the CPU 250 proceeds to the processing at step S1814, and transmits the transmission packet with no processing thereon. This processing is described above as Operation IV-A by the failure analysis and path control unit 254 of the CPU 250 in FIG. 4B.

If the determination at step S1810 provides YES, the CPU 250 increments the value of the variable j by one, and then returns to the determination processing at step S1809. If the valid condition j corresponding to a new value of the variable j remains in the entry E in the failure information table 255, the CPU 250 repeatedly executes the matching determination processing at step S1810.

If it determined at step S1810 that the transmission packet matches all condition fields in the entry E, and it is determined at step S1809 that no unprocessed valid condition field remains (the determination provides NO), the CPU 250 proceeds to step S1812. At step S1812, the CPU 250 processes the header information of the transmission packet without affecting distribution thereof so that the transmission packet does not match, for example, the first condition 1 in the entry E (step S1812).

Thereafter, the CPU 250 records the current flow as the header processing (processed value) of the transmission packet and a transmission action in the flow cache in the RAM 251, and then executes the transmission processing (step S1813). This processing is described above as Operation IV-B by the failure analysis and path control unit 254 of the CPU 250 in FIG. 4B. Thereafter, the CPU 250 returns to the waiting processing of the transmission packet at step S1801.

FIGS. 19A, 19B, and 19C each illustrate exemplary processing of the header of the transmission packet at step S1812 in FIG. 18. FIG. 19A illustrates examples of the destination node of an entry in the failure information table 255 matching the transmission packet, and the condition field (condition 1, condition 2). The MAC address ("Svr3 MAC" in FIG. 19A) of Server #3 in FIG. 9 is stored as the destination node ID. A link selection condition corresponding to the calculation equation $F(H(p), M)=0$ is stored as condition 1 in the format described above with reference to FIG. 14A. In this case, M in the calculation expression is the link number M, and "0" is the calculation resultant value N. The calculation resultant value N of "0" is stored as a result of the left bit shift operation on the binary number of "1" by 0 bit in the format of the Port Vector in FIG. 14A. Thus, this calculation is expressed as "PV=1<<0=0x0000000000000001", where PV represents the Port Vector. Then, a calculation program code (refer to FIGS. 14B and 14C) indicated by the algorithm ID corresponds to the left-hand side $F(H(p), M)$ of the calculation expression. The symbol p in the calculation expression indicates the header of a transmission packet. Similarly to condition 1, a link selection condition corresponding to a calculation equation $F'(H(p), M')=0$ is stored as condition 2 in the format described above with reference to FIG. 14A.

The repetition processing at steps S1808 to S1811 in FIG. 18 described above determines whether the transmission packet matches condition 1 and condition 2 of the entry in the failure information table 255 described above. If the transmission packet matches both condition 1 and condition 2, that is, the transmission packet $p \rightarrow F(H(p), M)=0 \char`\^ F'(H(p), M')=0$, the header of the transmission packet is processed at step S1812 in FIG. 18.

In a header processing method 1, the value of a transmission source port number (the field of "L4 Src Port" in FIG. 19B or FIG. 19C) in a layer 4 protocol may be processed, for example, as represented by a change from FIG. 19B to FIG. 19C. The layer 4 (L4) protocol is, for example, UDP or TCP. This protocol type is specified by the field of "L4 Type" in the header of the transmission packet illustrated in FIG. 19B or FIG. 19C.

In the process processing, $F(H(p), M)$ and $F(H(p'), M)$ are calculated for, for example, the first condition 1 in the entry E with the transmission packets p and p' before and after a change of a value xxx of the field of "L4 Src Port" into a value xxx' by one. Then, the field value xxx' when $F(H(p), M) \neq F(H(p'), M)$ holds, that is, $F(H(p'), M)=1$ holds for $F(H(p), M)=0$ is newly set to the field of "L4 Src Port".

As a result, the unprocessed header of the transmission packet exemplarily illustrated in FIG. 19A is processed as exemplarily illustrated in FIG. 19B. Since a cyclic redundancy check (CRC) calculation often used in calculation of H(p) or H(p') represented by Expression (1) described above is a residue calculation, whether a calculation result is odd or even is controlled by the least significant bit. Thus, F(H(xxx), M)≠F(H(xxx+1), M) is expected for most switching devices 101. In other words, in principle, the process processing of a header only involves addition of one to the field value xxx of the field of "L4 Src Port" does not request a long calculation time.

The above-described processing method 1 may be applied to an overlay protocol using encapsulation with which a change of the value of the field of "L4 Src Port" causes no problem. For example, a virtual extensible local area network (WLAN) may be adopted as the overlay protocol. Alternatively, a stateless transport tunneling protocol for network virtualization (STT) may be adopted as the overlay protocol.

In a header processing method 2, the transmission source MAC address in a transmission packet may be changed. A failure avoidance MAC address is set for each transmission node (end node 102), and the transmission source MAC address of a flow affected by a failure is changed when the failure occurs. The failure avoidance MAC address requests to be uniquely determined for each of the transmission nodes (end nodes 102) in the network system 100 in FIG. 1.

In an exemplary determination of the failure avoidance MAC address, a particular value for failure avoidance is set to the higher 24 bits (OUI) of a MAC address. For example, this value is "C0:50:00". The MAC address of, for example, a physical NIC of a transmission node has its lower 20 bits shifted to the left by 4 bits, and is connected with the above-described OUI. For example, 16 failure avoidance MAC addresses are produced for each transmission node by using the lower 4 bits. Specifically, when, for example, the physical NIC of the transmission node has a MAC address of "00:99:01:FC:84:56", 16 failure avoidance MAC addresses of "C0:50:00:C8:45:60" to "C0:50:00:c8:45:6F" are obtained.

Next, other embodiments will be described. The other embodiments described below are different from the above-described embodiment in the data configuration of the destination node table 209, the data configuration of a failure notification packet, the data configuration of the failure information table 255, and the packet reception processing at an end node 102.

Figure 20:
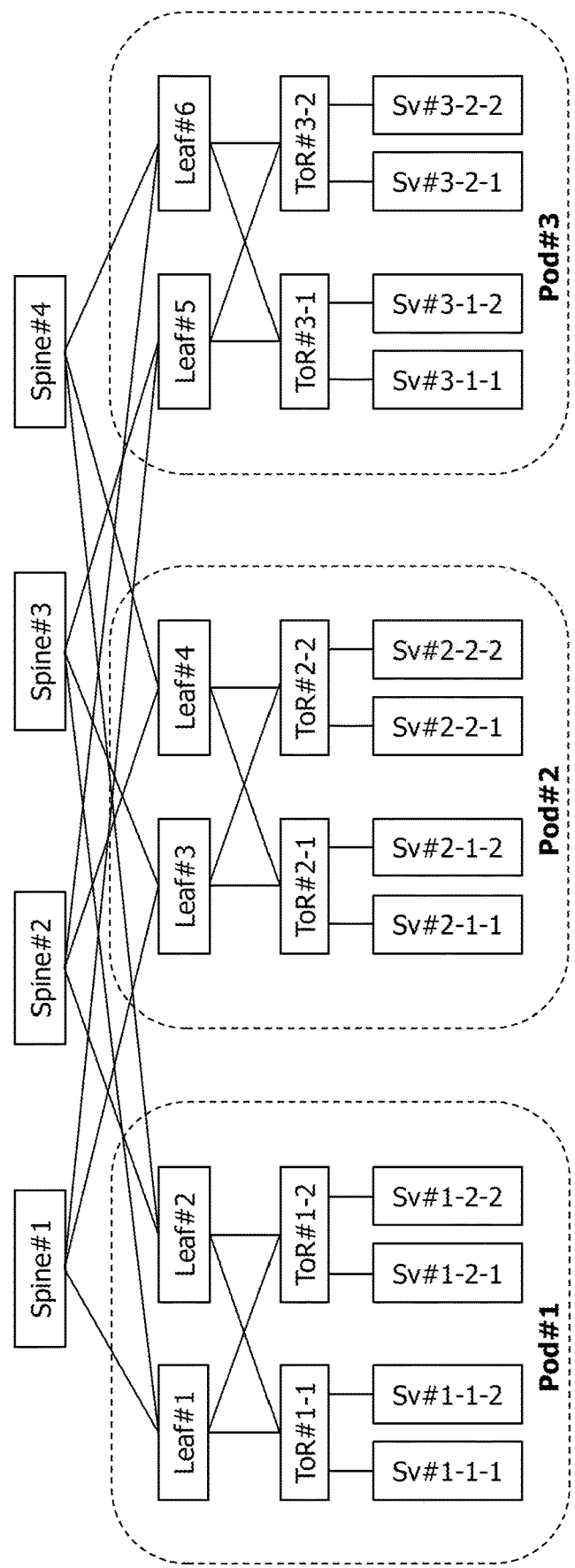
FIG. 20 is an explanatory diagram of another exemplary configuration of the destination node table for performing grouping.

FIG. 20 is an explanatory diagram of another exemplary configuration of the destination node table 209 stored in the RAM 205 in the switching device 101 in FIGS. 2A and 2B according to the other embodiment. This configuration enables grouping of destination node information.

The exemplary configuration of the destination node table 209 described above includes an entry storing the MAC address, the VLAN ID, and the Port Vector as exemplarily illustrated in FIG. 10. The exemplary configuration of the destination node table 209 has a configuration shared with a destination node table for performing a relay from the uplink-side port 202 to the downlink-side port 203 in the switching device 101.

The other exemplary configuration of the destination node table 209 illustrated in FIG. 20 is prepared separately from the destination node table for performing a relay from the uplink-side port 202 to the downlink-side port 203 in the switching device 101. In order to specify a group of destination nodes (end nodes 102) coupled to the downlink-side port 203 at which a failure is detected, the other exemplary configuration of the destination node table 209 employs location IDs that may be grouped in a hierarchical structure.

In the exemplary configuration of the destination node table 209 described above, the number of the destination MAC addresses becomes enormous as the number of the end nodes 102 increases.

In contrast, in the other exemplary configuration of the destination node table 209 in the other embodiment, the end nodes 102 are grouped so that the amount of destination node information is reduced.

The procedure of the grouping will be described with reference to FIG. 20. In the example in FIG. 20, three groups exist under the Spine level depending on the configuration of the network system 100 in FIG. 1. Each group is referred to as Pod, and Pod-ID is added to the group. A hierarchical structure ID of "Pod-ID+(in-Pod) ToR-ID+(in-ToR) Server-ID" is added to each end node 102. In the exemplary in FIG. 20, Pod #1, Pod #2, and Pod #3 correspond to Pod-ID. ToR #1-1 and ToR #1-2 correspond to ToR-ID in Pod #1. ToR #2-1 and ToR #2-2 correspond to ToR-ID in Pod #2. ToR #3-1 and ToR #3-2 correspond to ToR-ID in Pod #3. Sv #1-1-1 and Sv #1-1-2 correspond to Server-ID in ToR #1-1. Sv #1-2-1 and Sv #1-2-2 correspond to Server-ID in ToR #1-2. Sv #2-1-1 and Sv #2-1-2 correspond to Server-ID in ToR #2-1. Sv #2-2-1 and Sv #2-2-2 correspond to Server-ID in ToR #2-2. Sv #3-1-1 and Sv #3-1-2 correspond to Server-ID in ToR #3-1. Sv #3-2-1 and Sv #3-2-2 correspond to Server-ID in ToR #3-2.

In the other exemplary configuration of the destination node table 209 in the other embodiment, Pod-ID+ToR-ID is allocated to group the end nodes 102 under the same ToR. Pod-ID is allocated to group ToRs in Pod, that is, to group the end nodes 102 in Pod.

The grouping using the above-described location IDs may achieve significant reduction in the number of registered destination node tables 209 and the notification amount (data size) of failure notification packets when a failure occurs.

The end nodes 102 and the switching devices 101 in the network system 100 in FIG. 1 each store all above-described location IDs in advance.

Figure 21A:
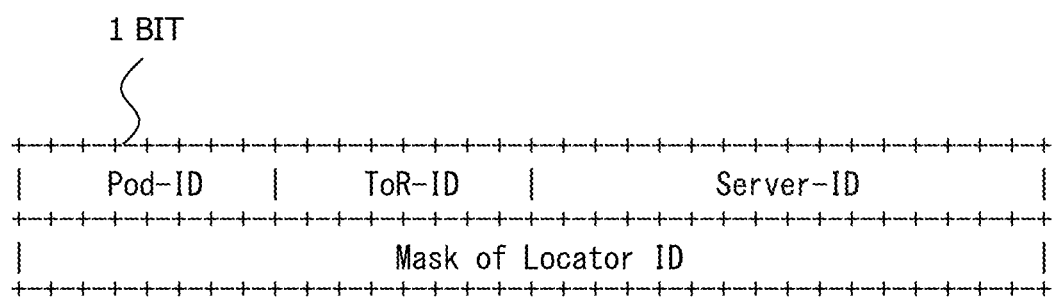
FIGS. 21A and 21B are each an explanatory diagram of an exemplary configuration of a location ID.
Figure 21B:
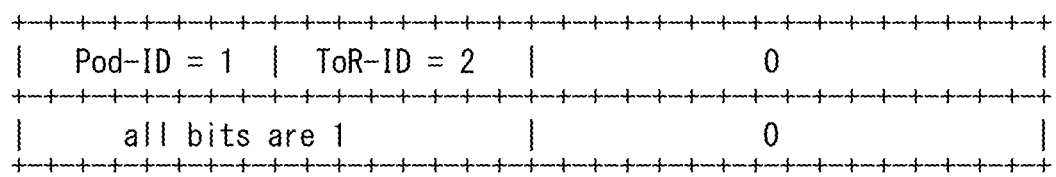

FIGS. 21A and 21B are each an explanatory diagram of an exemplary configuration of the location ID in the other embodiment. As illustrated in FIG. 21A, the location ID has 32-bit data consisting of Pod-ID of 8 bits, ToR-ID of 8 bits, and Server-ID of 16 bits, and mask data (Mask of Locator ID) of 32 bits used to mask this 32-bit data for grouping.

FIG. 21B illustrates an example of a location ID indicating Pod #1 and ToR #1-2 in FIG. 20, that is, a location ID indicating all end nodes 102 under ToR #1-2 under Pod #1. In the example in FIG. 21B, Pod-ID has "1" (=the value of "00000001" represented in an 8-bit binary value). ToR-ID has "2" (=the value of "00000010" represented in an 8-bit binary value). Server-ID has 16 bits of zeros. The mask data has the higher 16 bits of "1" for masking Pod-ID and ToR-ID and the lower 16 bits of "0" for masking Server-ID. The mask data activates Pod-ID of "1" and ToR-ID of "2", indicating the first Pod-ID Pod #1 and the second ToR-ID ToR #1-2 in the first Pod-ID.

FIG. 22 illustrates the other exemplary configuration of the destination node table 209 using the above-described location ID in the other embodiment. The other exemplary configuration of the destination node table 209 includes, for each memory address, position information, MASK information corresponding to the mask data, and the Port Vector described above with reference to FIG. 10. The example in FIG. 22 illustrates an exemplary content of the destination node table 209 stored in the switching device 101 as a Leaf in Pod #1 in FIG. 20. In this case, the Port Vector indicating a corresponding relay point port is stored for a common Pod-ID and each value of ToR-ID=1, 2, 3, . . . , N. Similarly to FIG. 21B, the value of the mask data has the hexadecimal number of 0xFFFF0000, that is, the higher 16 bits of "1" for masking Pod-ID and ToR-ID and the lower 16 bits of "0" for masking Server-ID.

In the other exemplary configuration of the destination node table 209 in FIG. 22, for example, the Port Vector with the value of "0x000000001" in hexadecimal number representation, that is, with "1" set to the zero-th bit in binary number representation is registered at the memory address of "1". Accordingly, a packet addressed to Sv #1-1-1 or Sv #1-1-2 under Pod-ID="1"="Pod #1" and ToR-ID="1"="ToR #1-1" stored at the memory address of "1" is relayed to a port with the port number of "1". In this manner, in the exemplary configuration in FIG. 22, destination node information addressed to two end nodes 102 is expressed by "the position information (location ID) and the MASK information (the mask data)" stored at one entry in the destination node table 209.

Figure 23:
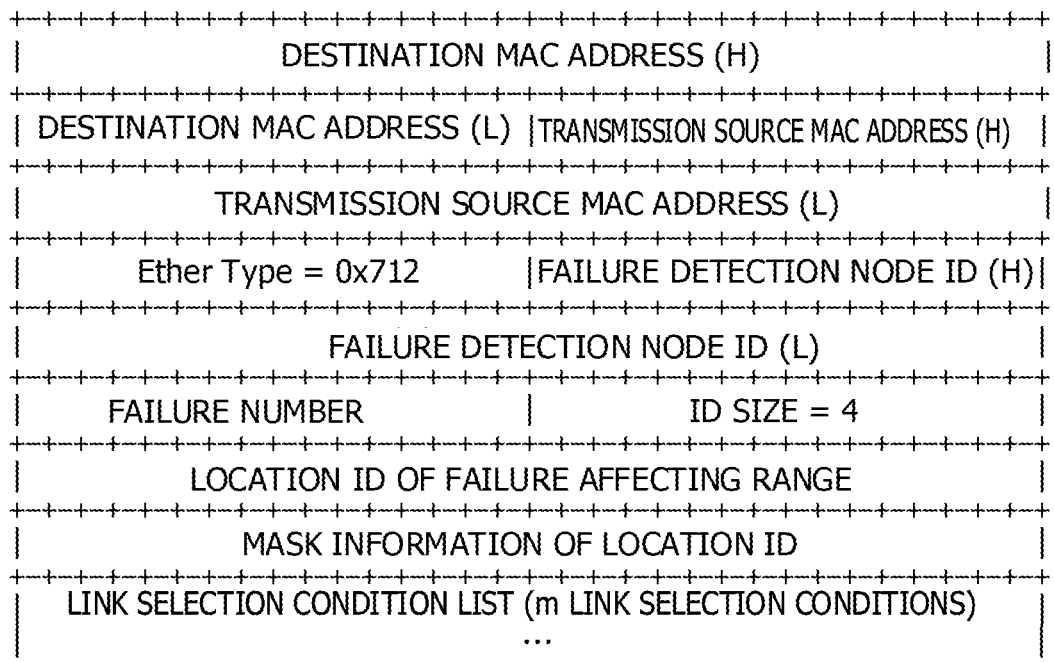
FIG. 23 illustrates another exemplary configuration of the failure notification packet.

FIG. 23 illustrates another exemplary configuration of a failure notification packet in the other embodiment. The other exemplary configuration of the failure notification packet in FIG. 23 is different from the exemplary configuration of a failure notification packet described above with reference to FIG. 11 in the following point. "Failure Affecting Range Node Number=n" and "Failure Affecting Range (Node ID (Six bytes)×n+Padding)" in the exemplary configuration described above are replaced with "ID size=4", "Location ID of Failure Affecting Range", and "Mask Information of Location ID" in the other exemplary configuration. As described above, the failure affecting range is specified by a pair of one grouped location ID and mask information (the mask data) corresponding to one downlink-side port 203 at a failure is detected. The location ID and the mask information have a data size of, for example, four bytes (32 bits). In a case in which the location ID is generated and allocated as a MAC address, the location ID has a specified data size of six bytes. The other configuration in the other exemplary configuration of the failure notification packet in FIG. 23 is the same as that in the exemplary configuration of the failure notification packet in FIG. 11.

Figure 24:
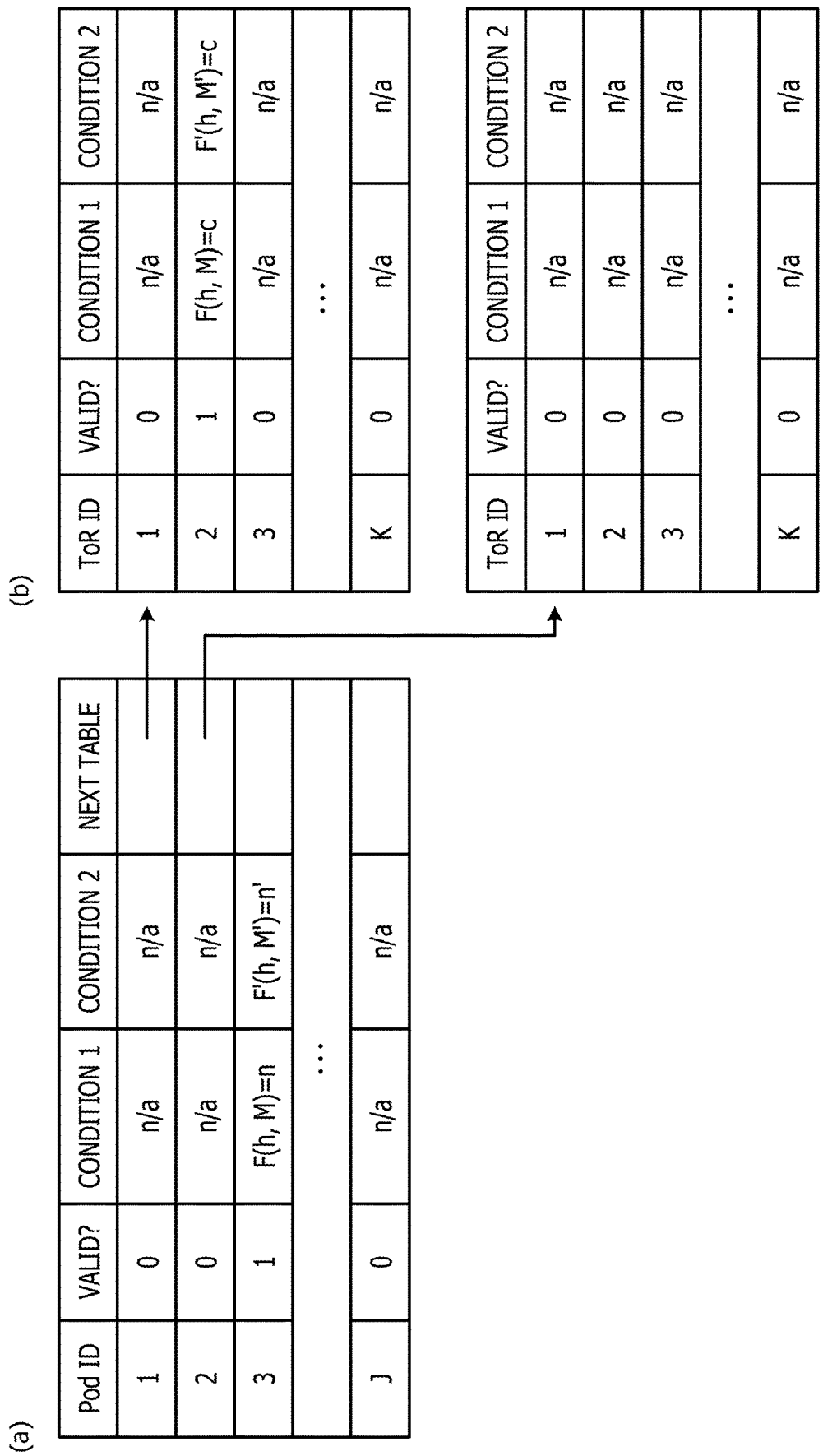
FIG. 24 illustrates another exemplary configuration of the failure information table.

FIG. 24 illustrates another exemplary configuration of the failure information table in the other embodiment. In this other exemplary configuration, the above-described location ID is used to specify a destination node group. The failure information table 255 is hierarchically generated at a transmission node (end node 102) in accordance with the hierarchical structure of location IDs described above with reference to FIG. 20. In the example in FIG. 24, one table Pod_Table storing failure information in the unit of Pod illustrated in (a) of FIG. 24 is generated, and a table ToR_Table storing failure information in the unit of ToR illustrated in (b) of FIG. 24 is generated for each Pod. An entry in the Pod_Table in (a) of FIG. 24 has the field of Pod-ID ("Pod ID" in (a) of FIG. 24), the field of "Valid?", a condition field of condition 1, condition 2, . . . , and the field of Next_Table ("Next Table" in (a) of FIG. 24). The field of "Next_Table" stores a pointer to ToR_Table in (b) of FIG. 24. If the location ID specified by a failure notification packet is in the unit of Pod+ToR, the pointer to ToR_Table is stored in the field of "Next_Table". If the location ID specified by a failure notification packet is in the unit of Pod, no pointer is stored in the field of "Next_Table". An each entry in ToR_Table in (b) of FIG. 24 has the field of ToR-ID ("ToR ID" in (b) of FIG. 24), the field of "Valid?", and a condition field of condition 1, condition 2, . . . . The condition field of condition 1, condition 2, . . . stored in each entry in each table in FIG. 24 is the same as that in the exemplary configuration of the failure information table 255 described with reference to FIGS. 13 and 14. The field of "Valid?" in each table in FIG. 24 indicates whether failure information is held at an entry including its field value. For example, in Pod_Table in (a) of FIG. 24, the content of an entry is active if the field of "Valid?" has the value of "1", or is invalid if the field has the value of "0".

When the other exemplary configuration of the failure information table 255 illustrated in FIG. 24 is employed, the following problem exists. When a transmission node (end node 102) transmits a transmission packet, a search of which entry as a combination of "Pod ID" and "ToR ID" in the failure information table 255 a destination node ID in the transmission packet corresponds to requests association of "Pod ID" and "ToR ID".

For example, the association is performed by generating and reallocating a node ID. In this method, a node ID (for example, a MAC address) is generated so as to satisfy a condition for a location ID, and allocated to each end node 102. The above-described newly allocated MAC address is used in place of a MAC address allocated to a network interface card (NIC). This achieves "node ID=location ID", so that the correspondence relation at packet transmission does not request to be examined.

In another example of the association, a correspondence table of the node ID and the location ID exemplarily illustrated in FIG. 25 is used. FIG. 25 illustrates an exemplary correspondence table of the node ID and the location ID. In FIG. 25, a hash table storing the location ID of Loc Id # j (j=1, 2, 3, . . . ) corresponding to the node ID of dmac # i (i=1, 2, 3, . . . ) is generated. The value dmac # i is, for example, the MAC address. The value Loc Id # j has the configuration exemplarily illustrated in, for example, FIGS. 21A and 21B. The correspondence table in FIG. 25 is referred to for a search target dmac (MAC address) specified as the destination node of a transmission packet, using a value n (=1, 2, . . . , N) calculated by "n=L (dmac)" as an index. A search is made for a slot at which the search target dmac matches dmac # i in each slot of a block referred to with the value n. The Loc Id # i of the slot at which dmac matches dmac # i is acquired as a location ID. Then, each entry in the failure information table 255 illustrated in FIG. 24 is searched with this location ID.

Figure 26:
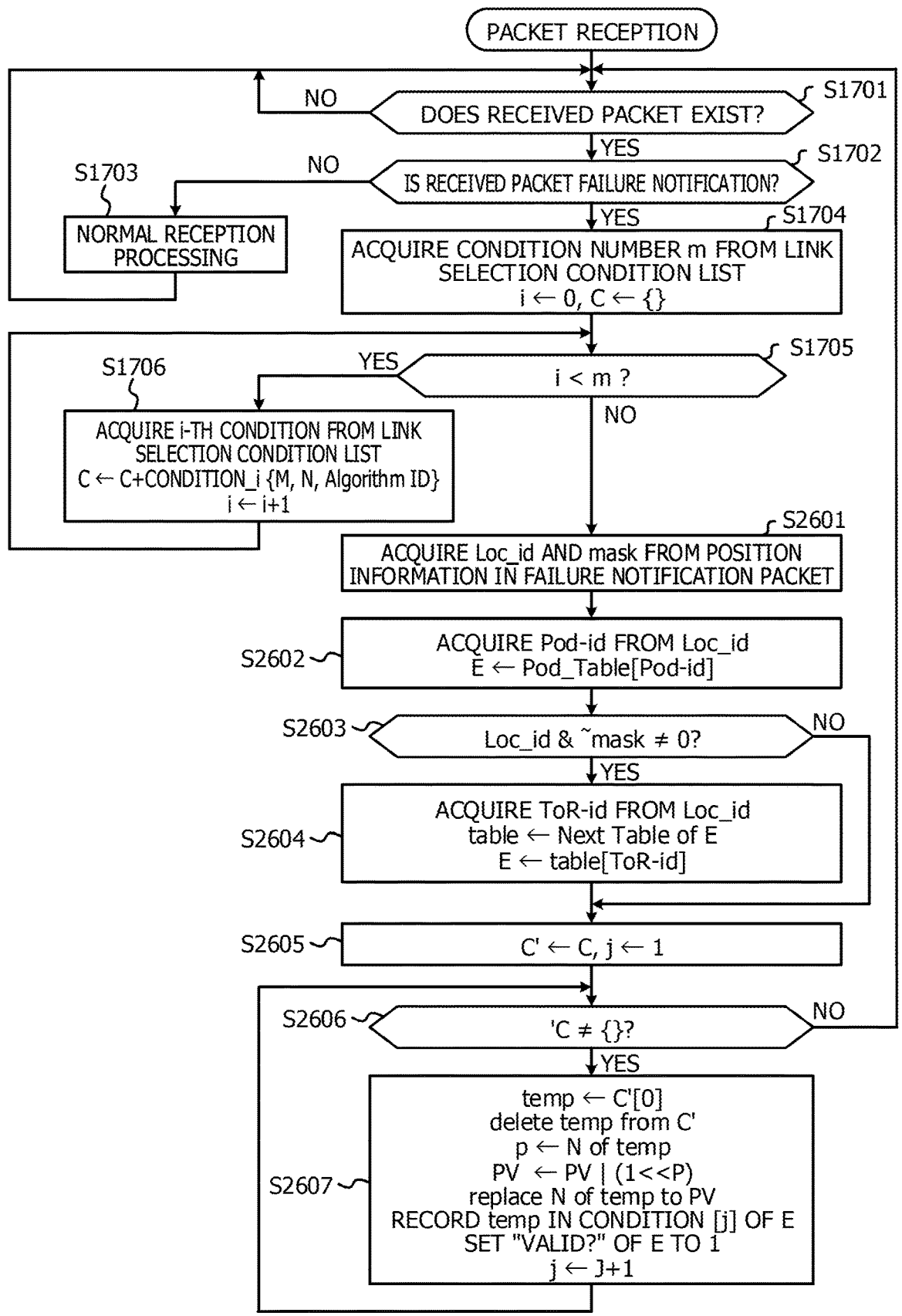
FIG. 26 is a flowchart of another exemplary packet reception processing in the end node.

FIG. 26 is a flowchart of another example of the packet reception processing executed by the CPU 250 in an end node 102 in FIG. 3C described above in the other embodiment. This is an example in which the above-described location ID is used. This processing is, for example, an operation in which the CPU 250 executes the packet reception processing program stored in the ROM not particularly illustrated. This processing is usually in an activated state.

The series of processing at steps S1701 to S1705 in the flowchart in FIG. 26 is the same as the series of processing denoted by the same step numbers of steps S1701 to S1705 in FIG. 17.

As a result, each link selection condition {M, N, Algorithm ID} in the link selection condition list exemplarily illustrated in FIG. 12 in the received failure notification packet exemplarily illustrated in FIG. 23 is stored in the array variable C in the RAM 251.

If the determination at step S1705 provides NO, the CPU 250 acquires the location ID and the mask data of the failure affecting range from the received failure notification packet exemplarily illustrated in FIG. 23, and stores the location ID and the mask data in variables "Loc_id" and "mask" in the RAM 251, respectively (step S2601).

Next, the CPU 250 acquires Pod-ID from the location ID (refer to FIG. 21A) stored in the variable Loc_id. Thereafter, the CPU 250 acquires, from Pod_Table, an entry for which the acquired Pod-ID is stored in the field of "Pod-ID" ("Pod ID" in (a) of FIG. 24). Then, the CPU 250 stores a pointer to this entry in the variable E in the RAM 251 (the above processing corresponds to step S2602).

Subsequently, the CPU 250 sets "0" at the bit position corresponding to "Pod ID", of the location ID (data on the first row in FIG. 21A) stored in the variable "Loc_id". The location ID with the bit position corresponding to "Pod ID" set to "0" is calculated as the bitwise AND of the location ID and a value with "0" set to the bit position corresponding to "Pod ID" and "1" set to the other positions. Thereafter, the CPU 250 calculates the bitwise AND of the location ID stored in the variable "Loc_id" and the mask data (data on the second row in FIG. 21A) stored in the variable "mask". Specifically, when the location ID has the format exemplarily illustrated in FIGS. 21A and 21B, this series of calculations is expressed as "Loc_id & 0x00FF0000 & mask" where "Loc_id" represents the value of the location ID. The symbol "&" is the sign of the bitwise AND calculation. Then, the CPU 250 determines whether the bitwise AND calculation result is not equal to zero (step S2603).

If the determination at step S2603 provides YES, that is, the bitwise AND calculation result is not equal to zero, it is determined that the location ID is specified in the unit of Pod+ToR. In this case, the CPU 250 further acquires ToR-ID from the location ID stored in the variable "Loc_id". Then, the CPU 250 acquires, in Pod_Table exemplarily illustrated in (a) of FIG. 24, a pointer to ToR_Table from the field of "Next_Table" ("Next Table" in (a) of FIG. 24) in the entry acquired at step S2602. Then, the CPU 250 stores the pointer in a variable table in the RAM 251. The CPU 250 further acquires, from ToR_Table pointed by the variable table, an entry for which the acquired ToR-ID is stored in the field of "ToR-ID" ("ToR ID" in (b) of FIG. 24) in ToR_Table. Then, the CPU 250 overwrites a pointer to this entry on the variable E in the RAM 251 (the above processing corresponds to step S2604). Accordingly, an entry pointed by the variable E is, for example, an entry in ToR_Table exemplarily illustrated in (b) of FIG. 24.

If the determination at step S2603 provides NO, that is, the bitwise AND calculation result is equal to zero, it is determined that the location ID is specified in the unit of Pod. In this case, the CPU 250 skips the processing at step S2604. As a result, an entry pointed by the variable E is, for example, an entry in Pod_Table exemplarily illustrated in (a) of FIG. 24.

Next, the CPU 250 moves the m link selection conditions stored in the array variable C by the repetition processing at step S1706 into the array variable C' in the RAM 251, and stores an initial value of one in the repetition control variable j in the RAM 251 (the above processing corresponds to step S2605).

Thereafter, the CPU 250 determines whether the array variable C' does not have an empty element (C'≠{ }) (step S2606).

If the array variable C' does not have an empty element (the determination at step S2606 provides YES), the CPU 250 executes the following processing. Similarly to step S1713 in FIG. 17, the CPU 250 first stores the link selection condition {M, N, Algorithm ID} as the leading element C'[0] in the array variable C' in the temporal variable "temp" in the RAM 251. Next, similarly to step S1713 in FIG. 17, the CPU 250 deletes the leading element corresponding to the temporal variable "temp" in the array variable C' ("delete temp from C'" in FIG. 26). Next, similarly to step S1713 in FIG. 17, the CPU 250 extracts the calculation resultant value N from the link selection condition {M, N, Algorithm ID} stored in the temporal variable "temp", and stores the calculation resultant value N in the variable p in the RAM 251 ("p←N of temp" in FIG. 26). Next, similarly to step S1713 in FIG. 17, the CPU 250 performs the left bit shift operation on the value of "1" by the number of bits corresponding to the calculation resultant value p (=N) stored in the variable p. In other words, a calculation expressed as "1<<p" is executed.

Similarly to step S1713 in FIG. 17, the CPU 250 sets, as a new PV value, a result of the bitwise OR calculation of the binary number of the calculation result and the binary number of a Port Vector (PV) stored in advance in an entry in the failure information table 255 pointed by the variable E. In other words, a calculation expressed as "PV←PV| (1<<p)" is executed. As described above, the variable E points to an entry in ToR_Table in (b) of FIG. 24 if step S2604 is executed, that is, the location ID is specified in the unit of Pod+ToR by a failure notification packet. The variable E points to an entry in Pod_Table in (a) of FIG. 24 if step S2604 is not executed, that is, the location ID is specified in the unit of Pod by the failure notification packet. Then, similarly to step S1713 in FIG. 17, the CPU 250 replaces, with the new PV value, the calculation resultant value N in the link selection condition {M, N, Algorithm ID} stored in the temporal variable "temp" ("replace N of temp to PV" in FIG. 26). As a result, the content of the temporal variable "temp" is set to the link selection condition {M, PV, Algorithm ID}. The CPU 250 records (overwrites) the link selection condition {M, PV, Algorithm ID} of the temporal variable "temp" onto the j-th the condition j indicated by the value of the variable j in an entry pointed by the variable E in the failure information table 255 exemplarily illustrated in FIG. 13 in the RAM 251. The CPU 204 sets the value of the field of "Valid?" in the entry to "1". As described above, the above-described entry content update is executed on an entry in ToR_Table in (b) of FIG. 24 if step S2604 is executed, that is, the location ID is specified in the unit of Pod+ToR by the failure notification packet. The above-described entry content update is executed on an entry in Pod_Table in (a) of FIG. 24 if step S2604 is not executed, that is, the location ID is specified in the unit of Pod by the failure notification packet. Finally, the CPU 250 increments the value of the variable j by one (the above processing corresponds to step S2607).

Thereafter, the CPU 250 returns to the determination processing at step S2606, and repeats the processing at step S2607 while the array variable C' has a link selection condition element.

If, as a result of the above-described repetition processing, the array variable C' has an empty element and thus the determination at step S2606 provides NO, the CPU 250 returns to the reception waiting processing at step S1701.

As described above, in the present embodiment, having detected a failure at the downlink-side port 203, the switching device 101 (first switching device) notifies failure information including information on a node group coupled to the failure port as the failure affecting range. Having received a failure notification from the uplink-side port 202, the switching device 101 (second switching device) adds, to the failure notification, a condition that the port at which the failure notification has been received is selected as a relay point, and transmits the failure notification with the condition added thereto. An information processing device (end node 102) having received these failure notifications stores the failure information. Then, at packet transmission, the information processing device specifies a flow affected by the failure based on the stored failure information, and processes a transmission packet belonging to the flow so as to avoid a condition that the transmission packet is relayed to a failure spot. In this manner, the present embodiment may provide a network system achieving effective use of a communication band when a failure occurs, by performing path change of a flow affected by the failure. The present embodiment may provide the network system 100 capable of notifying the failure in a fixed time dependent on the number of network levels, thereby achieving fast failure avoidance. The present embodiment may also provide the network system 100 that does not request a controller because of a path control by load distribution in Area 1 and a path control on a downlink-side port in Area 2 based on the FDB.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network system comprising:
    a plurality of switch devices including a first switch device and a second switch device; and
    an information processing device,
    the first switch device includes:
        a first plurality of ports; and
        a first processor configured to:
            when a failure occurring at a first port of the first plurality of ports, detect the failure,
            generate failure information of the first port, and
            transmit a failure notification packet including the failure information to other switch devices of the plurality of switch devices through the first plurality of ports other than the first port,
    the second switch device includes:
        a second plurality of ports; and
        a second processor configured to:
            receive the failure notification packet through a second port among the second plurality of ports,
            add selection condition information to the failure notification packet to generate a selection-condition-added packet,
            transmit the selection-condition-added packet through a port among the second plurality of ports which is coupled to the information processing device, the selection condition information indicating a selection condition that the second port that receives the failure notification packet is selected as a port to relay a packet, and
    the information processing device includes:
        a third processor configured to
            receive the selection-condition-added packet,
            extract the failure information and the selection condition information from the selection-condition-added-packet,
            stores the failure information and the selection condition information in a first memory, and
            perform a path control of a packet based on the selection condition information in the first memory.

2. The network system according to claim 1, wherein
    the second switch device includes a second memory configured to store a port selection condition table for storing the selection condition information corresponding to each of the second plurality of ports, and
    the second processor is configured to:
    acquire selection condition information corresponding to the second port from the port selection condition table when the second port is the port among the second plurality of ports and is not coupled to the information processing device, and
    generate the selection-condition-added packet by adding the acquired selection condition information to the failure notification packet.

3. The network system according to claim 2, wherein
    the port selection condition table is configured to store the link number, algorithm identification information, and correspondence information as the selection condition information corresponding to each port of the second plurality of ports, the link number being the number of ports of the second plurality of ports, at which no failure is occurring, the algorithm identification information specifying an algorithm to be used in a calculation in which one of the ports at which no failure is occurring is selected with the packet received by the second switch device and the link number as inputs, and the correspondence information indicating correspondence between each of the ports at which no failure is occurring and a resultant value of the calculation, and
    the second processor is configured to acquire, as the selection condition information from the port selection condition table, the link number, the algorithm identification information, and the resultant value of the calculation corresponding to the second port.

4. The network system according to claim 2, wherein when the second port is the port among the second plurality of ports and is coupled to the information processing device, the second processor is configured to transmit the failure notification packet through a port other than the second port among the second plurality of ports.

5. The network system according to claim 1, wherein
    the first switch device includes a third memory configured to store a destination node table for storing a correspondence relation between destination node information corresponding to a destination node as an information processing device, and a port among the first plurality of ports, which is to relay a packet addressed to the destination node, and
    the first processor is configured to:
        acquire the destination node information corresponding to the first port from the destination node table, and
        generate the failure information including the acquired destination node information.

6. The network system according to claim 5, wherein
    the destination node information includes a media access control (MAC) address of the destination node, and
    the first processor is configured to:
    acquire at least one MAC address corresponding to the first port from the destination node table, and
    generate the failure information including the acquired at least one MAC address as a failure affecting range.

7. The network system according to claim 5, wherein
the destination node information includes position information indicating the position of a group of the destination nodes in the network system, and
the first processor is configured to:
   acquire position information corresponding to the first port from the destination node table, and
   generate the failure information including the acquired position information as a failure affecting range.

8. The network system according to claim 7, wherein
the destination node information includes mask information for masking the position information so as to specify a position of the group of the destination nodes in a hierarchy of the network system, and
the first processor is configured to:
   acquire the mask information corresponding to the position information from the destination node table, and
   set the acquired mask information in the failure information.

9. The network system according to claim 1, wherein
the first memory is configured to store a failure information table including an entry in which at least one piece of the selection condition information in the received selection-condition-added packet is associated with each destination node information included in a failure affecting range in the received selection-condition-added packet, and
the third processor is configured to:
   acquire, from the failure information table, the at least one piece of selection condition information in the entry corresponding to the destination node information of the packet to be transmitted, and
   set a header of the packet to be transmitted such that the packet does not match the selection condition, when the packet to be transmitted matches all the selection conditions corresponding to the acquired at least one piece of selection condition information.

10. A method executed in a network system including a plurality of switch devices and an information processing device, the plurality of switch devices including a first switch device and a second switch device, the method comprising:
   when a failure occurring at a first port of a first plurality of ports in the first switch device, detecting the failure by a first processor of the first switch device;
   generating, by the first processor of the first switch device, failure information of the first port;
   transmitting, by the first processor of the first switch device, a failure notification packet including the failure information to other switch devices of the plurality of switch devices through the first plurality of ports other than the first port;
   receiving, by a second processor of the second switch device, the failure notification packet through a second port among a second plurality of ports,
   adding, by the second processor, selection condition information to the failure notification packet to generate a selection-condition-added packet,
   transmitting, by the second processor, the selection-condition-added packet through a port among a second plurality of ports which is coupled to the information processing device, the selection condition information indicating a selection condition that the second port that receives the failure notification packet is selected as a port to relay a packet;
   receiving the selection-condition-added packet by a third processor of the information processing device,
   extracting, by the third processor, the failure information and the selection condition information from the selection-condition-added packet,
   storing, by the third processor, the selection condition information and selection condition information into a first memory in the information processing device; and
   performing, by the third processor, a path control of a packet based on the selection condition information in the first memory.

11. The method according to claim 10, wherein
the second switch device includes a second memory configured to store a port selection condition table for storing the selection condition information corresponding to each of the second plurality of ports, and
the method further comprises:
   acquiring, by the second switch device, selection condition information corresponding to the second port from the port selection condition table when the second port is the port among the second plurality of ports and is not coupled to the information processing device; and
   generating, by the second switch device, the selection-condition-added packet by adding the acquired selection condition information to the failure notification packet.

12. The method according to claim 11, wherein
the port selection condition table is configured to store the link number, algorithm identification information, and correspondence information as the selection condition information corresponding to each port of the second plurality of ports, the link number being the number of ports of the second plurality of ports, at which no failure is occurring, the algorithm identification information specifying an algorithm to be used in a calculation in which one of the ports at which no failure is occurring is selected with the packet received by the second switch device and the link number as inputs, and the correspondence information indicating correspondence between each of the ports at which no failure is occurring and a resultant value of the calculation, and
the acquiring acquires the link number, the algorithm identification information, and the resultant value of the calculation corresponding to the second port, as the selection condition information from the port selection condition table.

13. The method according to claim 11, further comprising:
   when the second port is the port among the second plurality of ports and is coupled to the information processing device, transmitting, by the second switch device, the failure notification packet through a port other than the second port among the second plurality of ports.

14. The method according to claim 10, wherein
the first switch device includes a third memory configured to store a destination node table for storing a correspondence relation between destination node information corresponding to a destination node as an information processing device, and a port among the first plurality of ports, which is to relay a packet addressed to the destination node, the method further comprises:
acquiring, by the first switch device, the destination node information corresponding to the first port from the destination node table, and
the generating generates the failure information including the acquired destination node information.

15. The method according to claim 14, wherein
the destination node information includes a media access control (MAC) address of the destination node,
the acquiring acquires at least one MAC address corresponding to the first port from the destination node table, and
the generating generates the failure information including the acquired at least one MAC address as a failure affecting range.

16. The method according to claim 14, wherein
the destination node information includes position information indicating the position of a group of the destination nodes in the network system,
the acquiring acquires position information corresponding to the first port from the destination node table, and
the generating generates the failure information including the acquired position information as a failure affecting range.

17. The method according to claim 16, wherein
the destination node information includes mask information for masking the position information so as to specify a position of the group of the destination nodes in a hierarchy of the network system,
the acquiring acquires the mask information corresponding to the position information from the destination node table, and
the method further comprises:
setting, by the first switch device, the acquired mask information in the failure information.

18. The method according to claim 10, wherein
the first memory is configured to store a failure information table including an entry in which at least one piece of the selection condition information in the received selection-condition-added packet is associated with each destination node information included in a failure affecting range in the received selection-condition-added packet, and
the method further comprises:
acquiring, by the third processor, from the failure information table, the at least one piece of selection condition information in the entry corresponding to the destination node information of the packet to be transmitted; and
setting, by the third processor, a header of the packet to be transmitted such that the packet does not match the selection condition, when the packet to be transmitted matches all the selection conditions corresponding to the acquired at least one piece of selection condition information.

* * * * *